(12) United States Patent
Ito et al.

(10) Patent No.: US 7,991,400 B2
(45) Date of Patent: Aug. 2, 2011

(54) WIRELESS COMMUNICATION SYSTEM, SYSTEM CONTROLLER, ACCESS POINT, STATION, COMMUNICATION CONTROL METHOD AND COMPUTER-READABLE MEDIUM STORING COMMUNICATION CONTROL PROGRAM

(75) Inventors: Tetsuya Ito, Tokyo (JP); Akira Matsumoto, Tokyo (JP); Yuichiro Ezure, Tokyo (JP); Hiroyuki Iizuka, Tokyo (JP)

(73) Assignee: NEC Communication Systems, Ltd., Tokyo (JP)

( * ) Notice: Subject to any disclaimer, the term of this patent is extended or adjusted under 35 U.S.C. 154(b) by 1057 days.

(21) Appl. No.: 11/822,739

(22) Filed: Jul. 9, 2007

(65) Prior Publication Data
US 2008/0013558 A1    Jan. 17, 2008

(30) Foreign Application Priority Data
Jul. 10, 2006   (JP) .................................. 2006-189854

(51) Int. Cl.
*H04L 12/46* (2006.01)
(52) U.S. Cl. ...................................... 455/436; 455/438
(58) Field of Classification Search ............... 455/452.1, 455/423, 436, 438, 439, 11.1, 41.2; 370/338
See application file for complete search history.

(56) References Cited

U.S. PATENT DOCUMENTS

| | | | |
|---|---|---|---|
| 6,567,670 B1 * | 5/2003 | Petersson ...................... | 455/522 |
| 7,729,700 B2 * | 6/2010 | Alemany et al. ............... | 455/436 |
| 2004/0203787 A1 * | 10/2004 | Naghian ....................... | 455/437 |
| 2008/0056209 A1 * | 3/2008 | Newman et al. ............... | 370/338 |

FOREIGN PATENT DOCUMENTS

| | | |
|---|---|---|
| JP | 2004-320132 | 11/2004 |
| JP | 2004-349777 | 12/2004 |

\* cited by examiner

*Primary Examiner* — Nghi H Ly
*Assistant Examiner* — Myron Wyche
(74) *Attorney, Agent, or Firm* — McGinn IP Law Group, PLLC

(57) ABSTRACT

The use of a wireless interface is dynamically changeable according to connection states of stations belonging to access points. Therefore, limited wireless interfaces are efficiently utilized without requiring operation in which the user conducts a complex setting operation. First, connection states of stations belonging to access points are measured. Based on information of the connection states, the connection destination of a wireless connection unit of an access point under consideration is changed over between an access point and a station.

72 Claims, 11 Drawing Sheets

WIRELESS COMMUNICATION SYSTEM, SYSTEM CONTROLLER, ACCESS POINT, STATION, COMMUNICATION CONTROL METHOD AND COMPUTER-READABLE MEDIUM STORING COMMUNICATION CONTROL PROGRAM

This application is based upon and claims the benefit of priority from Japanese patent application No. 2006-189854, filed on Jul. 10, 2006, the disclosure of which is incorporated herein in its entirety by reference.

BACKGROUND OF THE INVENTION

1. Field of the Invention

The present invention pertains to a wireless communication system including an access point connected via wireless communication to a backbone network such as a wired Local Area Network (LAN), and a system controller, an access point, a station, a communication control method, and a computer-readable medium storing a communication control program for use with the wireless communication system.

2. Description of the Related Art

In a general wireless communication system, an access point or a wireless base station is linked with a station or a wireless communication terminal in an infrastructure mode and the access point is coupled by wire with a backbone network such as a wired LAN.

In a recent communication technique, the access points are linked via wireless communication with each other to configure a backhaul communication line up to the backbone network using the wireless communication between the access points.

Some wireless communication systems associated with the present invention include first and second mobile communication terminals or stations as described in, for example, Japanese Patent Application Laid-Open No. 2004-320132 (document 1). In such systems, the first station detects at least intensity of a received radio wave from a wireless LAN access point or a communication state of the radio wave. If it is determined that communication is possible using a wireless LAN interface, the first station conducts communication by use of the wireless LAN interface. The second station operates in an infrastructure mode if it includes an access point function and operates in an ad hoc mode if it includes a client function.

In other wireless communication systems, if an instruction is issued and data to be communicated by the instruction is, for example, mobile picture data of which the amount is equal to or more than a predetermined amount of data, the system changes its operation mode to an infrastructure mode. Otherwise, the system changes its operation mode to an ad hoc mode as described in, for example, Japanese Patent Application Laid-Open No. 2004-349777 (document 2).

Referring now to FIG. 1, description will be given of problems of the general wireless communication system.

In the wireless communication system shown in FIG. 1, each of the access points 801a, 801b, and 801c includes two wireless interfaces 811 and 812.

The interface 812 is employed for a backhaul wireless line to relay communication between the access points. The interface 811 is adopted for access to accommodate a station 803a, 803b, 803c.

The access interface 811 includes a function to arbitrate conflict between the stations according to a polling control operation and a function to conduct a power saving control operation for the stations. The backhaul interface 812 adopts in most cases wireless access control of the type based on a distributed coordinate function to implement a mesh configuration of the backhaul wireless link.

The access point 801 constructs, by use of one wireless interface, a backhaul wireless network of the backhaul line to relay communication between the access points. Therefore, it is required in the backhaul network that wireless communication is conducted by using one wireless channel shared in the overall network.

In the example shown in FIG. 1, to implement communication between an external network 805 and the station 803c accommodated in the access point 801c, it is required that the access point 801b relays the communication. However, since the access point 801b uses only one wireless interface for the backhaul network, a radio channel of one and the same frequency is required to be shared between backhaul links L812 and L813.

As a result, due to influences of, for example, a problem of a station exposed to wireless communication and a problem of a concealed station, it is difficult to secure scalability to expand the zone of the backhaul network and the communication quality at the same time.

Also, since the access link to accommodate the stations is constructed using one wireless interface, it is required that the plural stations accommodated by the access link carry out communication by sharing the radio channel. This hence leads to a problem that the number of stations to be accommodated by the access link is limited. Particularly, in a situation in which the stations are densely placed at a particular position, the influences of interference and access conflict are not negligible.

To solve the problems, if the user conducts a setting operation for the access points according to the state of the network such as the state of installation of the access points, the setting operation is troublesome and takes a long period of time.

To remove the problems, it can also be considered to construct the system by use of access points each of which includes many wireless interfaces. However, the number of channels available for the wireless LAN is limited. Therefore, even if the number of interfaces is desirably increased, the advantageous effect is limited. The desirable increase in the number of wireless interfaces makes it difficult to reduce the production cost.

Moreover, as in the communication system of FIG. 1, if the backhaul interface and the access interface are fixedly allocated to the wireless interfaces of the access stations, there likely appears depending on the topology and traffic of the network a case in which the traffic concentrates on a particular wireless link and hence the network performance is lowered due to congestion. Contrarily, there may exist a wireless interface not used. Particularly, in use of a station of high mobility, these problems conspicuously take place when the traffic varies and/or moves.

According to the technique described in Japanese Patent Application Laid-Open No. 2004-320132, when a station relays wireless communication, the infrastructure mode and the ad hoc mode are discriminately employed according to the function of the station. That is, consideration is given neither to the operation of the access point to control connection of stations belonging thereto nor to the operation in which the setting of the destination of connection in the wireless interface is changed according to the state of connection to the backhaul wireless line for wireless communication between access points or is changed to the access use to accommodate the station.

According to the technique described in Japanese Patent Application Laid-Open No. 2004-349777, to adapt to the communication traffic predictable by an instruction thus issued, the setting of connection of the wireless interface is changed to the infrastructure mode or the ad hoc mode. Therefore, consideration is given neither to an operation of the access point to control connection of stations belonging thereto nor to the operation in which the setting of the destination of connection in the wireless interface is changed according to the state of connection to the backhaul wireless line to conduct wireless communication between access points or is changed to the access use to accommodate the station.

SUMMARY OF THE INVENTION

An exemplary object of the invention is to provide a wireless communication system, a system controller, an access point, a station, a communication control method, and a computer-readable medium storing a communication control program in which based on the state of connection of stations belonging to access points, the setting of destination of connection are dynamically changed in the wireless interface. Also, it is possible, by efficiently using limited wireless interfaces, to secure the increase in the number of simultaneously connectible stations and the improvement in the communication quality is achieved.

A wireless communication system according to an exemplary aspect of the invention comprises access points. The access points each include a wireless connection unit to wirelessly connect to other devices where at least one access point is connected wirelessly to a backbone network. The wireless communication system includes a connection state measuring unit that measures a connection state of a station belonging to one of the access points and a connection destination changeover unit that conducts a changeover of a connection destination used by the wireless connection unit between an access point and a station according to information of the connection state measured by the connection state measuring unit.

A system controller according to an exemplary aspect of the invention communicates with access points that include a wireless connection unit to wirelessly connect to other devices where at least one access point is connected wirelessly to a backbone network. The system controller includes an access point information receiving unit that receives information of a connection state of connection with stations belonging to one of the access point, the information being measured by the access point; and a connection destination changeover unit for conducting a changeover of a connection destination used by the wireless connection unit between an access point and a station according to the information of the connection state received by the access point information receiving unit.

An access point according to an exemplary aspect of the invention communicates with a system controller controlling operation of the access point. The access point includes a wireless connection unit to wirelessly connect to other devices, a connection state measuring unit that measures a connection state of connection of a station belonging to the access point, a connection state transmitting unit that transmits information of the connection state measured by the connection state measuring unit to the system controller, and a connection destination changeover unit that conducts, at reception of a change instruction from the system controller according to the information of the connection state, a changeover of a connection destination used by the wireless connection unit between an access point and a station.

An access point according to an exemplary aspect of the invention includes: a wireless connection unit to wirelessly connect to other devices, the access point being connected in use via the wireless connection unit to other access points; a connection state measuring unit that measures a connection state of a station belonging to each access point connected to the access point, and a connection destination changeover unit that conducts a changeover of a connection destination used by the wireless connection unit between an access point and a station according to information of the connection state measured by the connection state measuring unit.

A station according to an exemplary aspect of the invention is communicable with an access point including a wireless connection unit to wirelessly connect to other devices. The station includes a multi-frequency connection unit connectible not only when a connection destination of the wireless connection unit of the access point is a station but also when the connection destination is an access point, and a target changeover unit for conducting a changeover of a connection target of the multi-frequency connection unit between a wireless connection unit for connection to a station and a wireless connection unit for connection between access points.

A communication control method according to an exemplary aspect of the invention is used for a wireless communication system comprising access points, the access points each including a wireless connection unit to wirelessly connect to other devices where at least one access point is connected wirelessly to a backbone network. The communication control method includes the connection state measuring step of measuring a connection state of a station belonging to one of the access points and the connection destination changeover step of conducting a changeover of a connection destination used by the wireless connection unit between an access point and a station according to information of the connection state measured by the connection state measuring step.

A computer-readable medium according to an exemplary aspect of the invention stores a communication control program for use with a wireless communication system comprising access points, the access points each including a wireless connection unit to wirelessly connect to other devices where at least one access point is connected wirelessly to a backbone network. The program causes a computer to perform connection state measuring processing for measuring a connection state of a station belonging to one of the access points and connection destination changeover processing for conducting a changeover of a connection destination used by the wireless connection unit between an access point and a station according to information of the connection state measured by the connection state measuring processing.

BRIEF DESCRIPTION OF THE DRAWINGS

Features of the disclosed embodiments will be described by way of the following detailed description with reference to the accompanying drawings in which.

DESCRIPTION OF EXEMPLARY EMBODIMENTS

Figure 1:
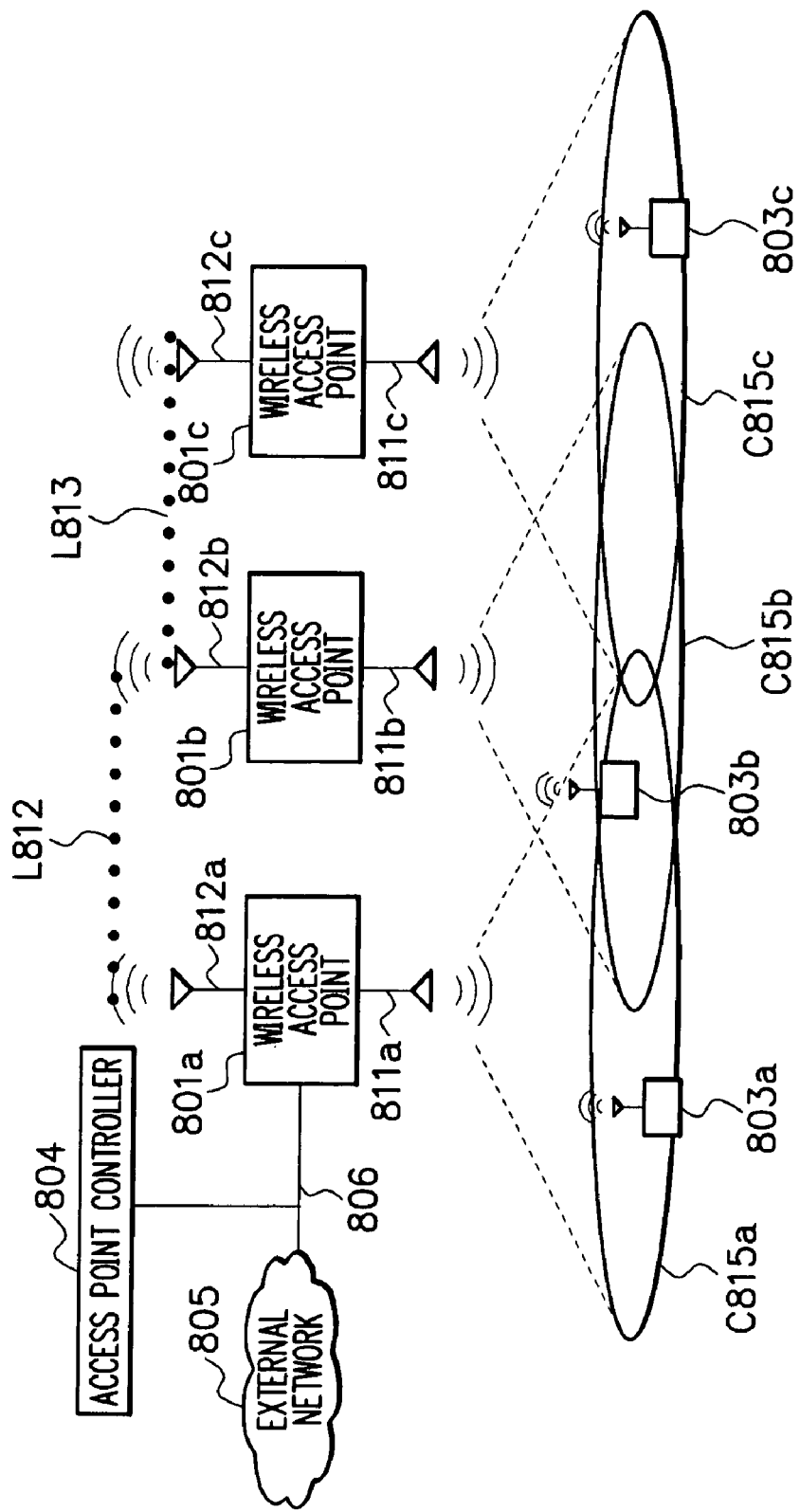
FIG. 1 is a schematic block diagram showing a configuration example of a wireless LAN system.

Referring next to the drawings, description will be given in detail of exemplary embodiments of a wireless communication system, a system controller, an access point, a station, a communication control method, and a computer-readable medium storing a communication control program.

Each embodiment of the present invention is a wireless LAN system including an access point having wireless interfaces. Depending on the topology, the communicable range, the traffic state, and the like of the wireless network, it is possible to determine an appropriate mode of the wireless interface of the access point AP, i.e., the backhaul interface to relay communication between access points AP or the access interface to accommodate the stations (ST) to thereby dynamically change the mode.

Therefore, each embodiment is a system including an access point that includes wireless interfaces and that mutually connects a backhaul wireless network relaying communication between access points with an access network accommodating stations. According to the topology, the communicable range, and the traffic state of the wireless network, the access point appropriately changes the wireless interface mode to the backhaul interface to relay communication between access points AP or the access interface to accommodate the stations ST.

For example, an access point to transfer traffic of relaying communication between access points changes the mode in order to increase the backhaul interface for the relay and to reduce the access interface for the accommodation of stations. This avoids congestion on the backhaul wireless link. Conversely, an access point having accommodated many stations conducts the mode change in order to increase the access interface for the accommodation of stations and to reduce the backhaul interface for the relay.

The access point controller or the system controller collects, according to necessity, the topology, the communicable range, and the traffic state of the network from each access point or each station. In mode determination processing on the access point controller, whether the mode change is required is determined on the basis of the collected information and the setting information designated by the user. The change is indicated to an associated access point to thereby conduct the mode change of the access point.

According to the system configuration, there may exist an access point of which all wireless interfaces are used to relay communication. To provide connectivity to an access point dedicated to the relay, a station to be additionally installed in the wireless LAN system is constructed to connect not only to the access link to accommodate stations but also to the backhaul network to relay communication between access points.

The mobile station is capable of conducting handover not only between access links for the accommodation of terminals, but also between a network for the accommodation of terminals and a network for the relay between access points as well as between a network for the relay between access points and a network for the relay between other access points.

First Exemplary Embodiment

Referring next to the drawings, description will be given of a first exemplary embodiment.

Figure 2:
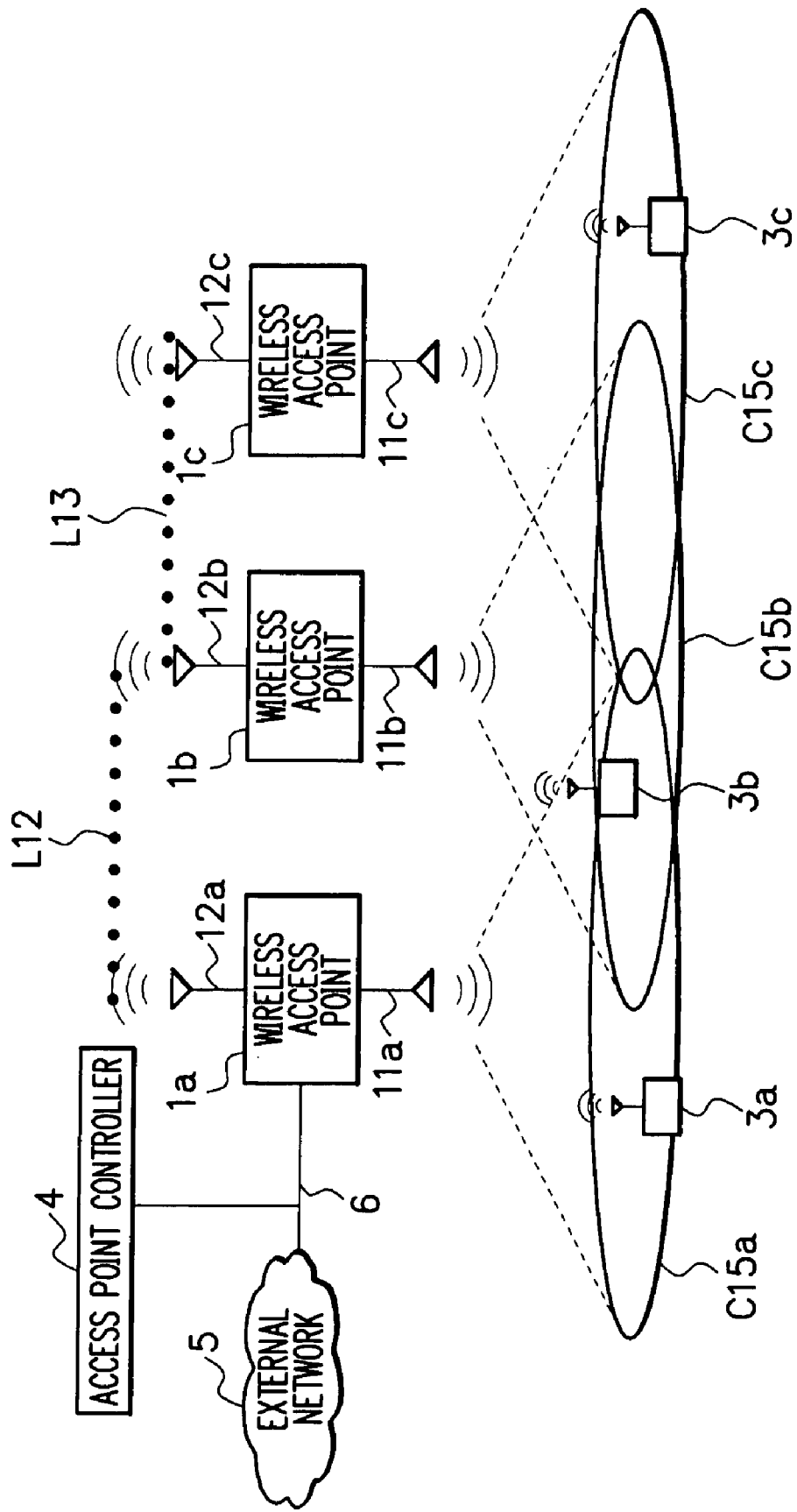
FIG. 2 is a block diagram showing an example of structure of the wireless LAN system.
Figure 3:
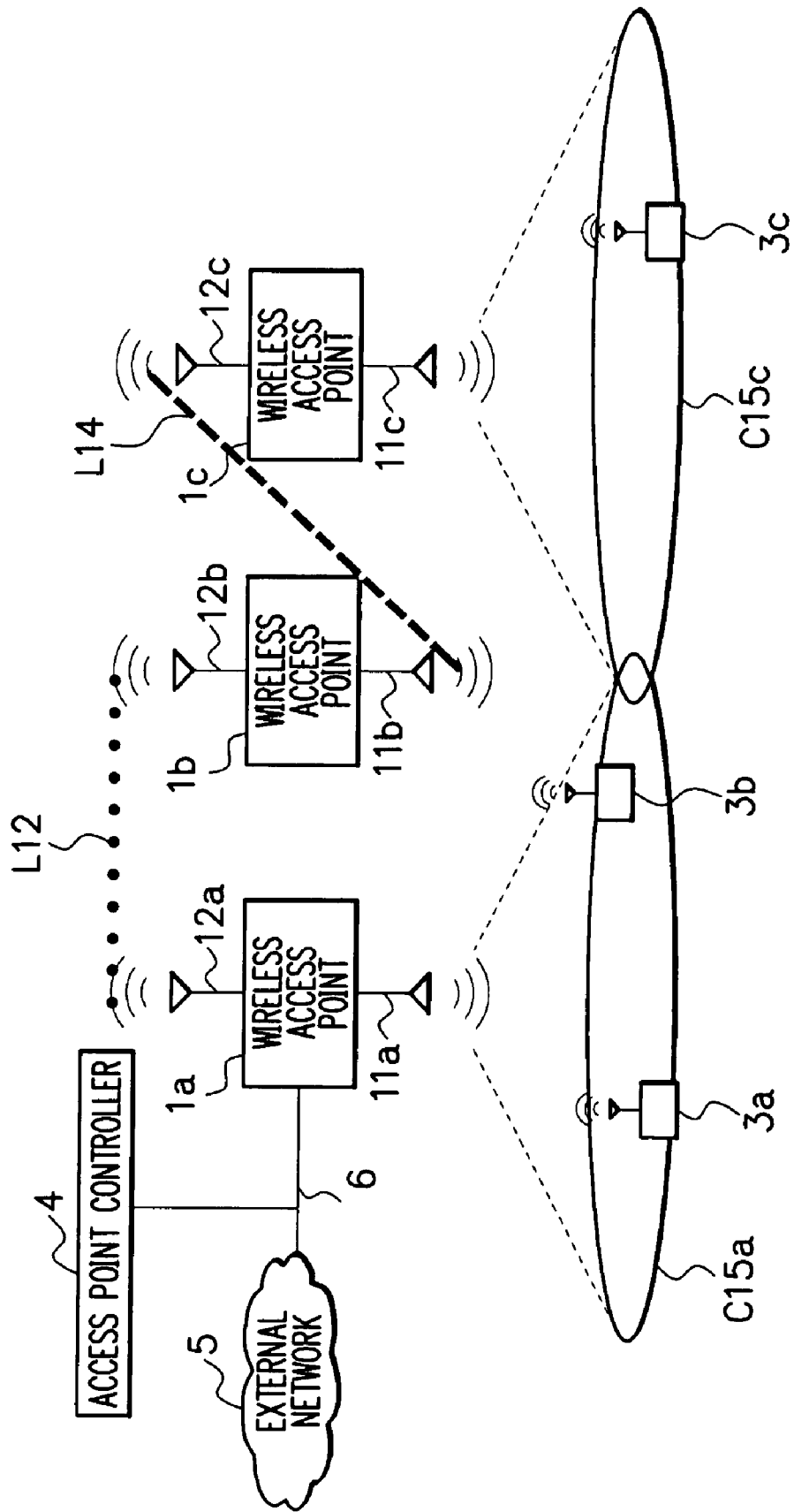
FIG. 3 is a block diagram showing another state of the wireless LAN system.

FIGS. 2 and 3 show examples of structure of the first exemplary embodiment.

According to the above techniques associated with the present invention, the method of using wireless interfaces is fixed by the mode allocation shown in FIG. 2. However, the state of FIG. 2 is changed to that of FIG. 3 and vice versa. Also, the mode setting (setting of the destination mode) to determine the purpose of utilization of the wireless interface is variable.

Referring to FIG. 2, the wireless LAN system includes access points 1 (1a, 1b, 1c, etc.) each including wireless interfaces and an access point controller 4 to control operation of each of the access points 1. The system is capable of wirelessly communicating with wireless stations 3 (3a, 3b, 3c, etc.) each including one wireless interface.

In the example shown in FIG. 2, each of the access points 1a to 1c includes two interfaces 11 and 12.

The access point 1a is coupled with a wired network, i.e., a backbone network 6 without using wireless communication and can communicate with an external network 5 only through a wired communication line. The access points 1b and 1c are linked with the wired network 6 via a backhaul wireless network between the access points.

The access point controller 4 is linked via the wired network 6 with the access point 1c. The controller 4 is connected to the access points 1b and 1c via a backhaul wireless network including backhaul wireless links L12 and L13 between the wireless interfaces of the access points 1a, 1b, and 1c.

According to the example of FIG. 2, the stations 3 connect to the associated access points via access links C15a and C15c (wirelessly communicable areas) of the access points.

Each of the stations 3 (3a, 3b, 3c, etc.) includes one wireless interface and hence is connectible to one access point. Each station 3 is also communicable with the external network 5 via the access link of the access point 1 connected thereto and the backhaul wireless network between the access points.

In the example of FIG. 3, when the station 3 accommodated in the access link C15c of the access point 1c desires to communicate with the external network 5, the access point 1c first receives communication data via the wireless interface 11 from the station 3. The access points 1a to 1c then relay the communication data via the wireless interface 12.

Figure 4:
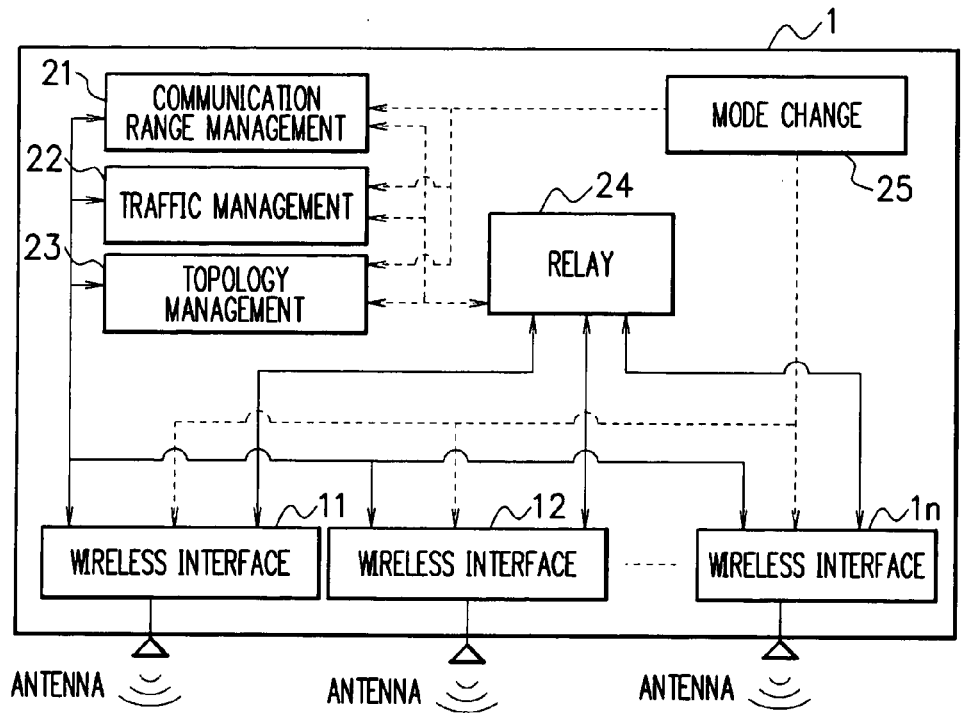
FIG. 4 is a block diagram showing an example of structure of an access point 1.

FIG. 4 shows a configuration of the access point 1.

The access point 1 includes a plurality of wireless interfaces 11, 12, . . . , 1n provided with respective antennas, a communication range managing unit 21 to manage various information, a traffic managing unit 22, a topology managing unit 23, a relay processing unit 24 to control transfer paths and to transfer communication data, and a mode change unit 25. The unit 25 operates, in response to an instruction from the access point controller, to instruct a mode change of the wireless interface and to notify associated information to the respective managing units.

Also, the access point 1 includes interfaces, not shown, to connect to other devices such as the access point controller 4.

Figure 5:
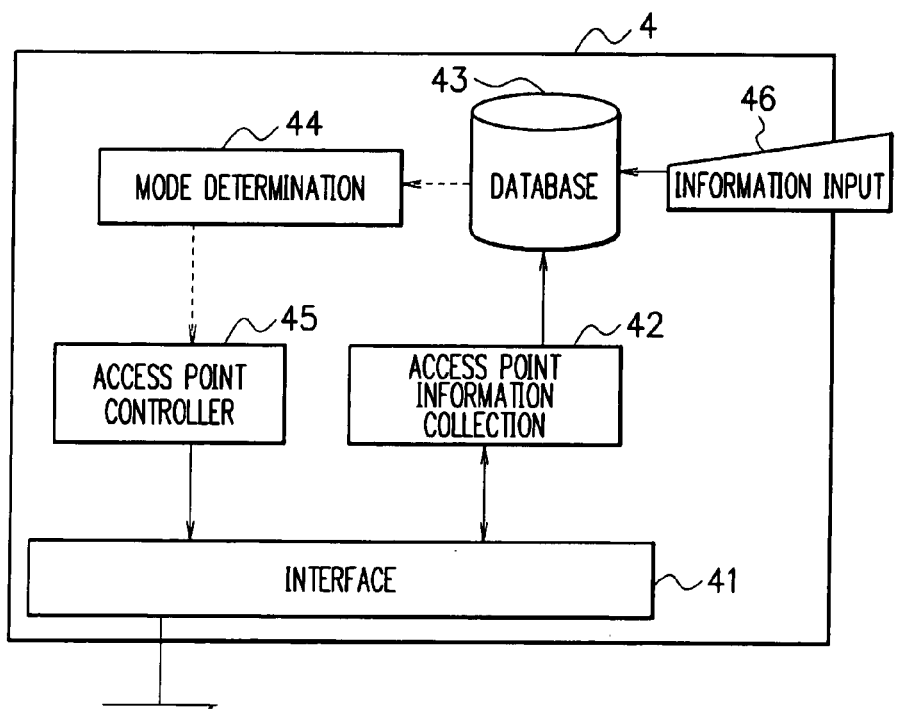
FIG. 5 is a block diagram showing a configuration example of an access point controller 4.

FIG. 5 shows a configuration of the access point controller 4.

The access point controller 4 includes an interface 41 to connect to the access points and an access point information collecting or receiving unit 42 to collect various information items such as a communication range, traffic, and topology from the access points. The controller 4 also includes a database 43 to store information items gathered by the unit 42, a mode determination unit 44 which refers to the database 43 to determine an appropriate mode of the wireless interface of the associated access point, and an access point controller 45 to send a result of the mode determination via the interface 41 to the mode change unit 25 of the associated access point. Also, the access point controller 4 includes an information input unit 46 which receives setting information supplied from the user and which stores the information in the database 43.

Next, description will be given of operation of each constituent component of the first exemplary embodiment of the wireless LAN system.

In the techniques associated with the present invention, the backhaul interface 12 and the access interface 11 are fixedly allocated to the wireless interfaces of the access points. Therefore, the setting of the destination of connection is in general fixed for the wireless interfaces as shown in FIG. 1.

In the first exemplary embodiment, the configuration can be autonomously altered from the state of FIG. 2 to that of FIG. 3 and vice versa. Description will now be given of a specific example of operation in the mode change from the configuration of FIG. 2 to that of FIG. 3 in which the setting of connection destination of the wireless interface is varies from the access interface to the backhaul interface.

The communication range manager 21 of the access point 1 obtains a communication range of an access link for each of the access stations in the periphery thereof. The communication range is a range in terms of distance in which the pertinent access point 1 is wirelessly communicable with another device such as a station. The access point 1 receives, by use of a radio communication period of the wireless interface thereof, a radio wave from a beacon or the like of a wireless interface set to the access interface of a peripheral access point. The communication range is attainable using electric field intensity of the received radio wave from the beacon.

In the example of FIG. 2, the interface 11 of the access point 1b can receive a beacon signal sent from the interface 11 of each of the access points 1a and 1c with electric field intensity equal to or more than a predetermined value. It is consequently possible to determine that the communication ranges of the access links C15a and C15c respectively of the access points 1a and 1c are in the neighborhood of the access point 1b. The communication range manager 21 keeps the communication range as management information.

The traffic managing unit 22 of the access point 1 obtains a state of traffic of each wireless interface. The traffic state can be determined on the basis of, for example, information indicating the number of stations connected to access links associated with the wireless interface set to the access interface, the amount of communication data relayed by the relay unit 24, the number of transmission retries, and the number of discarded packets. The traffic state can also be precisely calculated by monitoring communication sessions conducted by the stations.

The traffic manager 22 holds the traffic data as management information.

The topology managing unit 23 of the access point 1 detects adjacent access points by use of the backhaul wireless network formed by the wireless interface set to the backhaul interface and exchanges topology information. The detection of adjacent access points and the exchange of topology information are possible using, for example, the routine protocols such as Open Shortest Path First (OSPF; RFC2328) and Optimized Link State Routing (OLSR; RFC3626) as well as the bridge protocols such as spanning tree protocol (IEEE 802.1d).

The topology information to be exchanged includes not only information of transfer paths but also information which affects communication performance such as information of radio channels and transfer rates. In FIG. 2, according to the topology information, it is determined that the access points 1a and 1b are adjacent to each other via the backhaul link L12 and the access points 1b and 1c are adjacent to each other via the backhaul link L13, and hence one and the same radio channel is employed for communication.

Also, the topology manager 23 of the access point searches for a station connectible via the access link configured by the interface set to the access interface. The search for the station can also be accomplished by intercepting or monitoring communication carried out by peripheral stations. It is also possible that by determining a connected station according to the information of the traffic manager 22 of a peripheral access point, communication is directly attempted to the station. In the configuration of FIG. 2, the access point 1a is retrieved as a station connectible to two stations, and each of the access points 1b and 1c is retrieved as a station connectible to one station.

The topology information of the backhaul interface and information of stations accessible to the access interface are kept as management information in the topology manager 23 and are used as data path control information by the relay unit 24.

The access point information collector 42 of the access point controller 4 collects the topology information from the topology managers 23 respectively of the access points 1a to 1c, the communication range information from the communication range manager 21, and the traffic information from the traffic manager 22 and then keeps the collected information items in the database 43.

Also, the access point controller 4 may hold in the database 43 information from the information input unit 46 such as a keyboard, for example, user setting information manually designated by the user. In a situation in which the wireless interface mode is fixed or altered according to desire of the user or the traffic and the number of terminals to be accommodated are predictable, it is possible to set a value, for example, a value of capacity to be reserved as a setting value to the user setting information.

Figure 6:
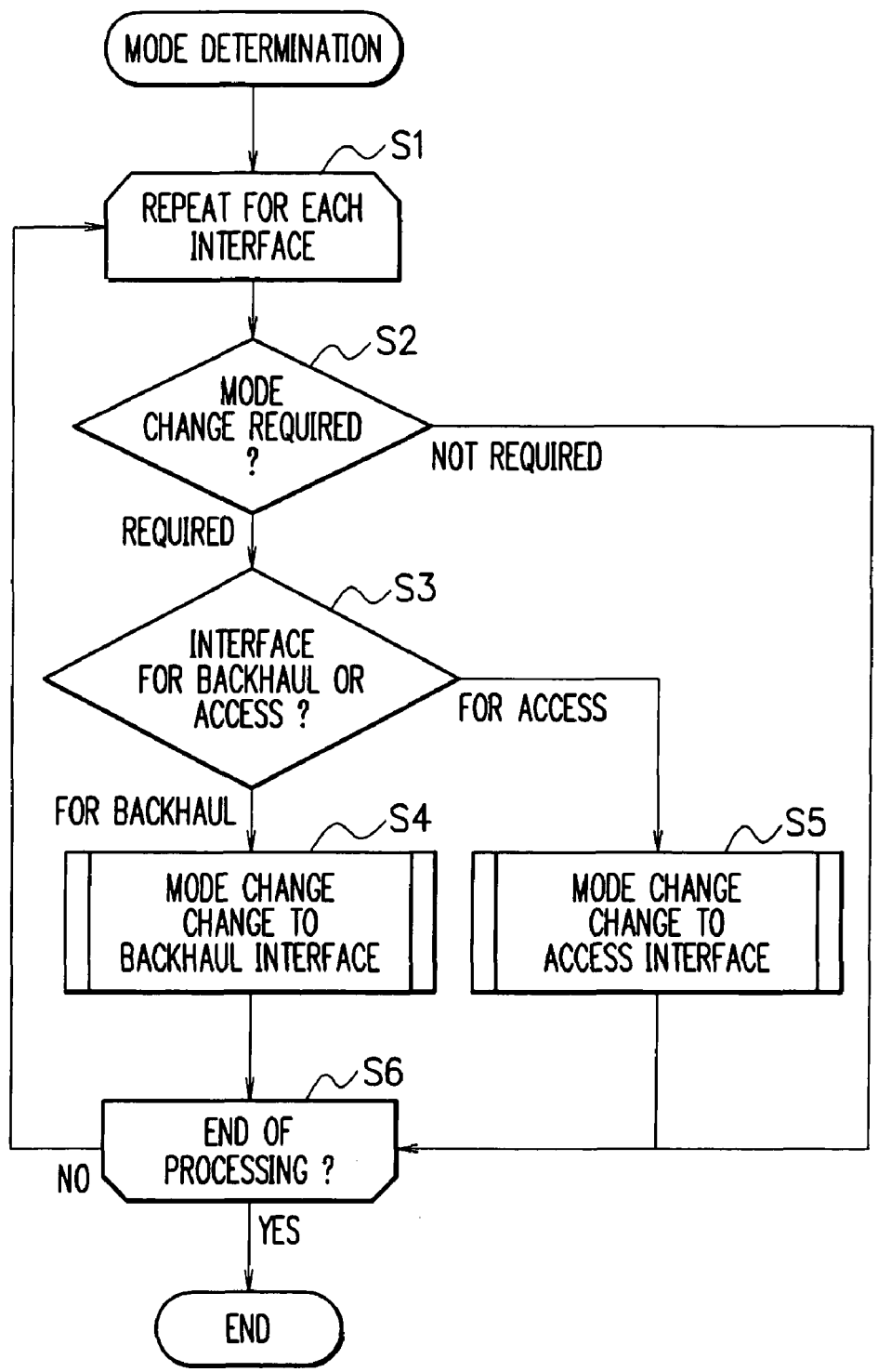
FIG. 6 is a flowchart showing mode determination processing.

Referring net to FIG. 6, description will be given of processing to alter the setting of the connection destination for the wireless interface in the exemplary embodiment of the wireless LAN system.

In the access point controller 4, the mode determination unit 44 executes mode determination processing. FIG. 6 is a flowchart showing the processing.

First, the unit 44 determines for a target wireless interface designated as the object of the determination processing whether or not the mode change is required (step S2). For example, the unit 44 refers to the traffic information and the topology information of associated access points held in the database 43. If it is determined according to the amount of communication data, the number of transmission retries, and the number of discarded packets that the communication quality of the link created by the target interface is not retained, the unit 44 determines that the mode change is required.

The state in which the quality of the communication link is not retained is a state in which information indicating the communication quality, for example, the number of transmission retries or the number of discarded packets is less than a predetermined threshold value.

The determination for the mode change is not limited to the operation using the traffic information and the topology information, but the operation may also be carried out on the basis of a combination of the communication range information and the user setting information. For example, even in a wireless interface with an intermediate amount of communication data, if the setting value of the user setting information for the communication range is a value in a range which leads to a large amount of traffic depending on situations, it is predictable that the communication quality is not retained. In this situation, the mode determination unit 44 determines that the mode change is required.

Next, if the wireless interface for which it is determined in step 2 that the mode change is necessary has been set to the backhaul interface, the unit 44 executes, in the mode change processing, processing to change the mode to the backhaul interface (step S4). If the target interface has been set to the access interface, the unit 44 executes processing to change the mode to the access interface (step S5).

After evaluating the interfaces of each access point held in the database 43, the mode determination unit 44 terminates the mode determination processing (step S6).

Referring next to the flowchart of FIG. 7, description will be given of the mode change processing in which the mode is changed to the backhaul interface.

When a mode change instruction is received from the mode determination unit 44, the mode change processing unit 25 of the access point 1 makes a check to confirm whether or not there exists an interface changeable to the backhaul interface, the interface being other than the interface for which it is determined by the access point 1 that the mode change is required (step S11). That is, any access interface or any unused interface may be used for the change to a backhaul interface. However, an interface being employed as a backhaul interface and an interface for which the user setting information inhibits the change to the backhaul interface are not used as interfaces changeable to the backhaul interface.

If the wireless interface determined as a target interface in step S11 is changed to a backhaul interface, an access link may disappear in conjunction therewith. Also in such situation, the mode determination unit 44 of the access point controller 4 makes a check to determine whether or not each of the stations is connectible to either one of the access points (step S12).

The check for the connectibility is possible by referring to information kept in the database 43, specifically, the information of stations connectible to access points, the communication range information, and the user setting information. The check may be more precisely carried out by further referring to the traffic information. If there exists a station not connectible to any access point, the mode change processing is terminated.

If the wireless interface selected as a target interface in step S11 is changed to a backhaul interface, the access link capacity, i.e., the connectible band capacity is reduced in the network. Even in this situation, the mode determination unit 44 makes a check to determine whether or not the traffic of each station belonging to an access point of the LAN system can be accommodated in either one of the access points (step S13).

This check is achievable by referring to information kept in the database 43, specifically, the information of stations connectible to access points, the communication range information and the traffic information, and the user setting information. If the mode determination unit 44 determines that the traffic is too large to be accommodated by the access points, the mode change processing is terminated.

There also exists a situation wherein even the interface attained as a target interface in step S11 is changed to a backhaul interface, the number of links between adjacent access points becomes large and the channel allocation is difficult. This leads to frequent occurrence of interference and hence it cannot be expected to improve the communication capacity of the backhaul network. Therefore, the mode determination unit 44 makes a check to determine whether or not communication capacity of the backhaul network (the band between the access points) is improved by the mode change to the backhaul interface (step S14).

The check for the improvement of the capacity is achievable by referring to the topology information, the traffic information, and the user setting information in the database 43. If the improvement of the capacity is not expectable, the mode change processing is terminated.

After the processing is completed with "yes" in steps S11 to S14, a wireless interface selected as a target interface in step S11 is changed to a backhaul mode (step S15). The mode change instruction is fed from the access point control unit 45 of the access point controller to the mode change unit 25 of the access point. The mode change instruction for the backhaul mode includes information items of a radio channel and an encryption key required for the interface to create a backhaul wireless network.

When the instruction is received, the mode change unit 35 of the access point sets the interface to a backhaul interface and then notifies the change to the communication range manager 21, the traffic manager 22, and the topology manager 23.

Referring next to the examples shown in FIGS. 2 and 3, description will be specifically given of the mode change processing after the mode determination to change the interface to a backhaul interface.

In the example of FIG. 2, it is determined in step S2 of FIG. 6 that the interface I2 of the access point 1b cannot retain the communication quality and hence the mode change is required. In this situation, it is necessary that the interface I2 of the access point 1b transfers not only the traffic of the station 3 connected to the access point 1b but also the traffic between the station 3 connected to the access point 1c and the external network. Therefore, the number of discarded packets increases depending on the traffic of the interface I2. It is hence possible to determine that the predetermined communication quality cannot be retained in the topology in which the backhaul links L12 and L13 share one and the same radio channel.

The access link C15b of the interface 11 of the access station 1b widely overlaps in the communication range with each of the access links C15a and C15c respectively of the access points 1a and 1c. There hence frequently occurs data retransmission due to interference depending on the radio channel employed for communication. This makes it difficult to retain the predetermined communication quality. As a result, the mode determination unit 44 determines that the mode change processing is required.

Figure 7:
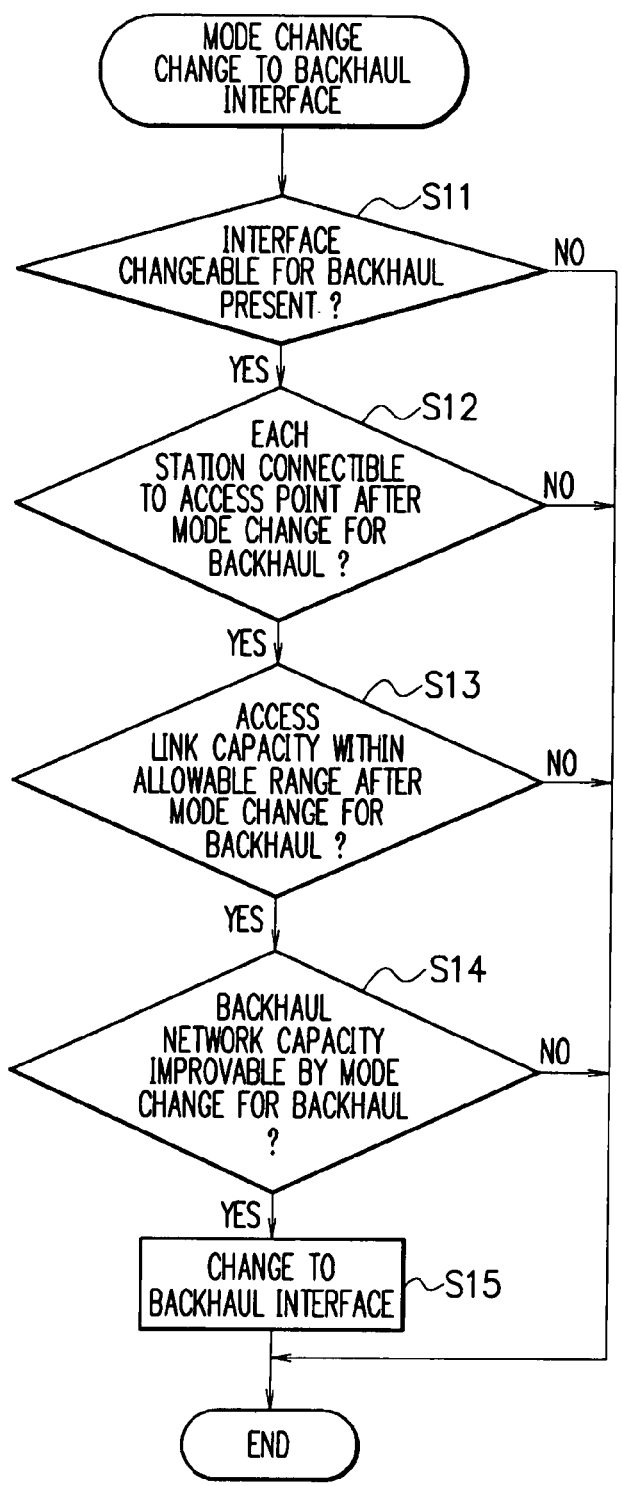
FIG. 7 is a flowchart showing an operation to change the current interface to a backhaul interface through mode change processing.

In step S11 of FIG. 7, the unit 44 confirms that the interface 11 of the access point 1b is changeable to a backhaul interface.

In step S12 of FIG. 7, even if the access link C15b has disappeared, it is determined that the station 3 on the access link C15b created by the interface 11 is connectible via the access link C15a to the access point 1a.

In step S13 of FIG. 7, the unit 44 confirms that the access link C15a is capable of accommodating the traffic of two stations 3.

In step S14 of FIG. 7, it is determined that a backhaul wireless link to the access point 1c can be created by designating the interface 11 of the access point 1b as a backhaul interface. In step S15 of FIG. 7, the access point control unit 45 of the access point controller 4 issues a mode change instruction to the access points 1b and 1c.

After the mode is changed, the backhaul radio links L12 and L13 are created in the system configuration as shown in FIG. 3. Wireless channels of mutually different frequencies are available for the links L12 and L13. In the configuration of FIG. 3, as compared with that of FIG. 2, the interference and the access conflict are reduced on the backhaul network, and hence the communication quality is improved.

Referring now to the flowchart of FIG. 8, description will be given of the mode change processing in which the target interface is altered to an access interface.

In this connection, a specific example of the interface change to an access interface in the mode change processing will be described later in the description of the second exemplary embodiment.

When a mode change instruction is received from the mode determination unit 44, the mode change processing unit 25 of the access point 1 confirms whether or not there exists an interface changeable to the access interface, the interface being other than the interface for which it is determined by the access point 1 that the mode change is required (step S21). Any backhaul interface or any unused interface may be used for the change to an access interface. However, an interface being adopted as an access interface and an interface for which the user setting information inhibits the change to the access interface are not used as target interfaces changeable to the access interface.

If the wireless interface determined as a target interface in step S21 is changed to an access interface, a backhaul wireless link may disappear as a result. Also in such case, the control unit 44 of the access point controller 4 makes a check to confirm whether or not each of the terminals is connectible to a backhaul network to be coupled via the network to the wired network 6 (22).

The check for the presence or absence of disconnection in the topology is possible by referring to the topology information and the user setting information kept in the database 43. If the disconnection is present,
the mode change processing is terminated.

If the wireless interface selected as a target interface in step S21 is changed to an access interface, the backhaul access link is reduced and hence the capacity of the backhaul network is insufficient in some cases. Therefore, the mode determination unit 44 makes a check to determine whether or not the communication capacity of the backhaul wireless network (the band between the access points) is within a allowable range, i.e., a predetermined range for the state of traffic of stations belonging to each access point of the LAN system, after the mode is changed to the access interface (step S23).

Whether or not the capacity is within the allowable range can be confirmed by referring to the topology information, the traffic information, and the user setting information. If the unit 44 determines that the capacity is beyond the allowable range, the mode change processing is terminated.

There also exists a situation wherein even the target interface obtained in step S11 is changed to an access interface, the number of access links is large and the allocation of a free channel is difficult, and hence interference frequently occurs. That is, it is not expectable to increase the access link communication capacity. Therefore, the mode determination unit 44 makes a check to determine whether or not the mode change to the access interface increases the total communication capacity of the access links created by the access points in the LAN system (step S24).

The check for the increase in the capacity can be carried out by referring to the communication range information, the traffic information, and the user setting information in the database 43. If the increase in the capacity is not expectable, the mode change processing is terminated.

After the processing in steps S21 to S24 results in "yes", the target interface selected in step S21 is changed to an access mode (step S25). The access point control unit 45 of the access point controller 4 delivers the mode change instruction to the mode change unit 25 of the access point. The mode change instruction for the access mode includes information items of a radio channel and an encryption key required for the interface to create an access link.

At reception of the instruction, the mode change unit 35 sets the interface to an access interface and notifies the mode change to the communication range manager 21, the traffic manager 22, and the topology manager 23.

The mode determination processing and the mode change processing may be executed during a test operation when access points are installed or may be dynamically executed according to the traffic state and the positions of the stations during the network operation. Also, the mode determination processing and the mode change processing may be conducted during a period of time when the traffic is reduced, for example, at midnight using daily statistic information.

The first exemplary embodiment leads to advantageous effects as below.

First, the communication quality is improved in the wireless LAN system for the following reason.

The adverse influence from the access conflict and the interference is reduced by appropriately changing usages respectively of the plural wireless interfaces of the access points on the basis of the information indicating states of connections such as the topology, the traffic, the communication range, and the positions of the stations.

Second, even if the traffic varies due to, for example, movement of stations, the communication quality is kept retained in the wireless LAN system.

This is because the system can flexibly cope with the variation in the traffic by appropriately and dynamically altering the mode setting of the destination of connection in each wireless interface of the access points based on the information indicating states of connections such as the topology, the traffic, the communication range, and the positions of the stations.

Third, the user can simply conduct an access point setting operation in the wireless LAN system.

The user's setting operation is simplified because the access points are wirelessly coupled with each other so that the uses of the wireless interfaces of the access points are automatically changed.

Fourth, the production cost of the wireless access point is lowered for the following reason.

Only a required number of wireless interfaces are mounted on the access point because the wireless interfaces between the access points are changeable according to uses thereof.

In the first exemplary embodiment, the setting of connection destination is dynamically and autonomously altered in the wireless interfaces on the basis of the information indicating states of connections such as the topology, the traffic, the communication range, and the positions of the stations. Therefore, the limited wireless interfaces can be efficiently utilized without requiring the user's operation of conducting a complex setting operation. This advantageously results in the increase in the number of stations simultaneously connectible in the system and the improvement of the communication quality of the system.

Second Exemplary Embodiment

Referring now to the drawings, description will be given of the second exemplary embodiment.

In the second exemplary embodiment, the access point $1b$ of the first exemplary embodiment includes three wireless interfaces. Description will be given of a concrete example of the mode change processing in which a target interface is changed to an access interface in the second exemplary embodiment.

Referring to the drawings, description will be given in detail of the configuration of the second exemplary embodiment.

Figure 9:
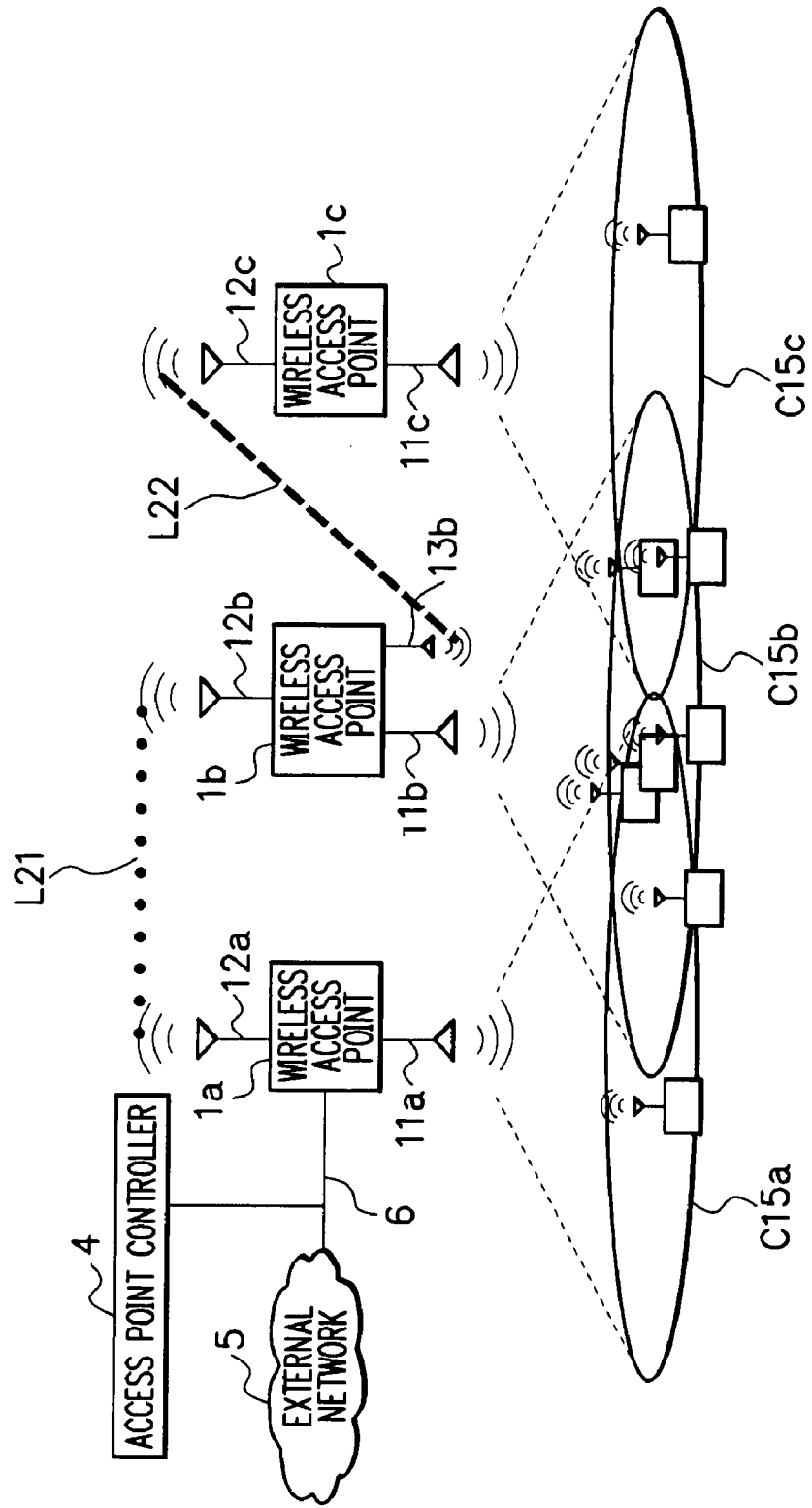
FIG. 9 is a block diagram showing an example of structure of the wireless LAN system.
Figure 10:
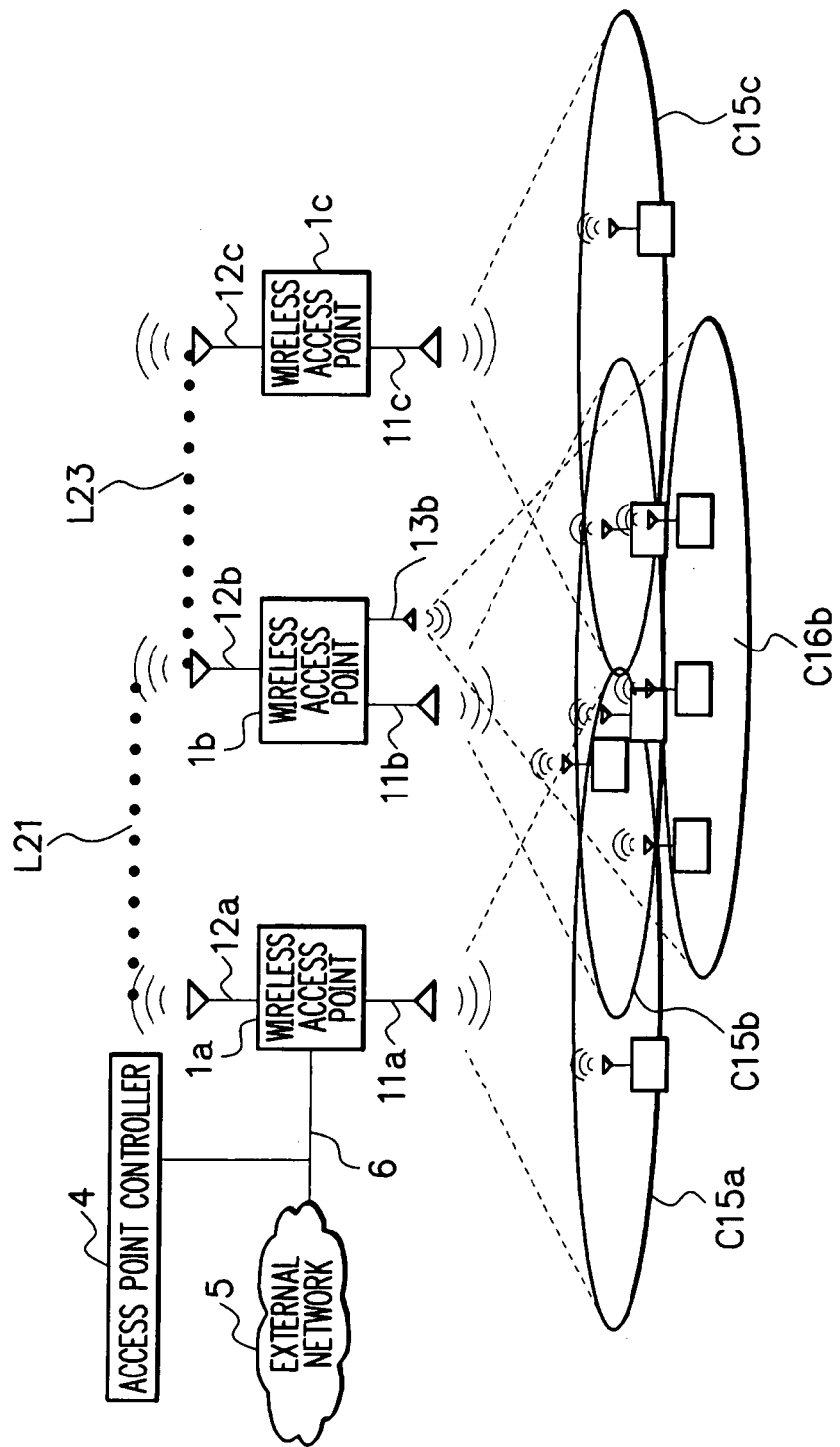
FIG. 10 is a block diagram showing another state of the wireless LAN system.

FIGS. 9 and 10 show examples of the configuration of the exemplary embodiment. The state of FIG. 9 are autonomously altered to that of FIG. 10 and vice versa. Next, description will be given of the change from the state of FIG. 9 to that of FIG. 10 by conducting a mode change of a backhaul interface to an access interface.

Referring to FIG. 9, the second exemplary embodiment includes an access point controller 4 to control access points, access points $1a$, $1b$, and $1c$ each of which includes a plurality of wireless interfaces, and stations each including one wireless interface. Each of the access points $1a$ and $1c$ includes two radio interfaces 11 and 12 and the access point $1b$ includes three radio interfaces $11b$, $12b$, and $13b$.

The access point controller 4 is coupled via a wired network 6 with the access point $1a$. The controller 4 is linked with the access points $1b$ and $1c$ via a backhaul radio network formed by backhaul radio links L21 and L22 between the radio interfaces of the access points.

Referring now to the examples shown in FIGS. 9 and 10, description will be given of the mode change processing after the mode determination to change the target interface to an access interface.

In the state of FIG. 9, the mode determination unit 44 refers to the traffic information in step S2 of FIG. 6. The unit 44 resultantly recognizes that the number of stations and the amount of traffic associated with the access link created by the interface $11b$ of the access point $1b$ are large and hence it is difficult for the interface $11b$ to retain the communication quality due to interference and access conflict. The unit 44 consequently determines that the mode change is required.

Figure 8:
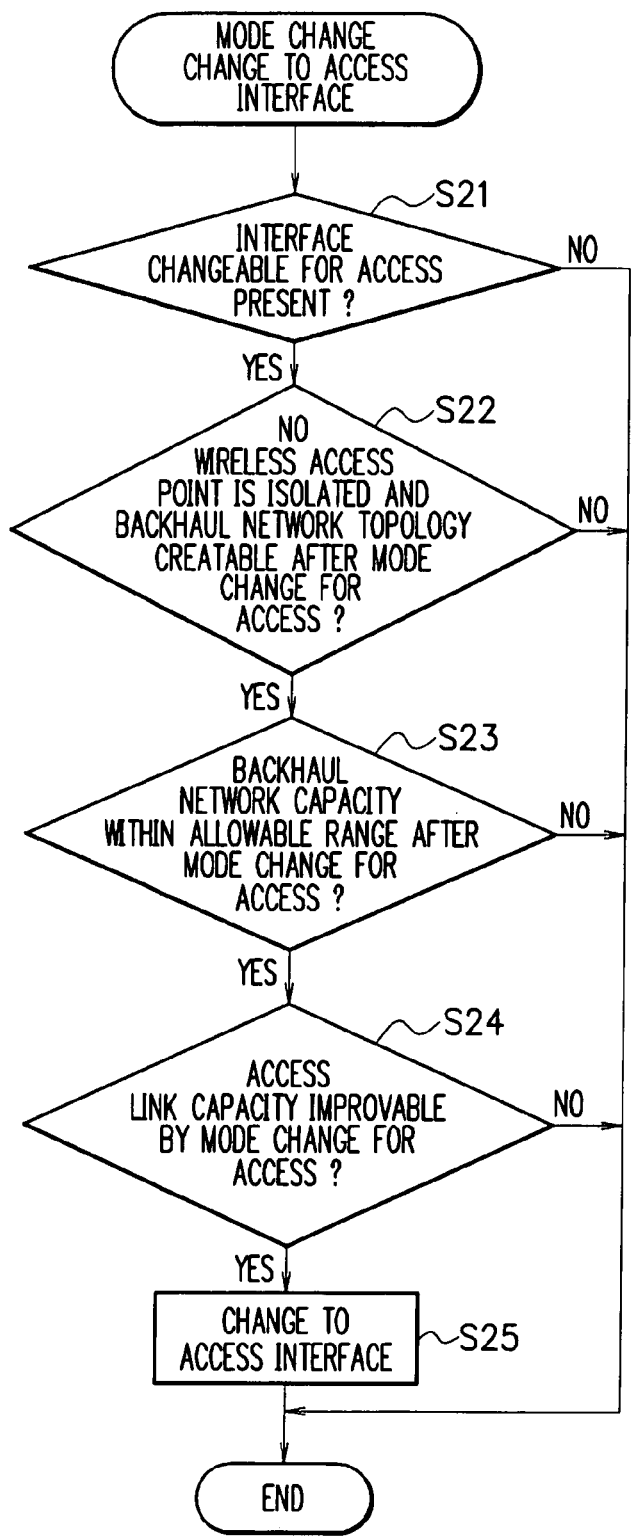
FIG. 8 is a flowchart showing an operation to change the current interface to an access interface through the mode change processing.

In step S21 of FIG. 8, the unit 44 confirms that the interface $13b$ of the access point $1b$ is changeable to an access interface.

In step S22, the units 44 determines that even in a situation wherein the backhaul link L22 configured by the interface $13b$ disappears, if the a new backhaul link is created by the interface $12b$ and the interface $12c$ of the access point $1c$, the topology is not disconnected and the access point $1c$ is not isolated.

In step S23, the unit 44 confirms that the new backhaul link thus created can relay traffic between the access points $1b$ and $1c$.

In step S24, it is determined that the station accommodating capacity of the access point $1b$ can be increased by changing the interface $13b$ of the access point $1b$ to an access interface. In step S25, the unit 44 issues a mode change instruction to the access points $1b$ and $1c$.

After the mode change is carried out, the system is configured as shown in FIG. 10 including the backhaul links L21 and L23 and the access link C16$b$ created by the interface $13b$. The stations to be accommodated in the access point $1b$ can be distributively accommodated in the interfaces $11b$ and $13b$, and hence the number of stations to be accommodated by the access point $1b$ is increased. Additionally, the interference and the access conflict are reduced and hence the communication quality is improved.

According to the second exemplary embodiment, there can be obtained advantageous effects similar to those of the first exemplary embodiment even when the access point includes three radio interfaces.

Third Exemplary Embodiment

Referring now to the drawings, description will be given of the third exemplary embodiment.

In this example of the third exemplary embodiment, the access stations of the first exemplary embodiment include an access station of which all wireless interfaces are adopted as backhaul interfaces.

Particularly, description will be given of an example of connection, to the wireless LAN system, of a station additionally installed in the system and a station which conducts a handover operation.

Referring to the drawings, description will be given in detail of the configuration of the third exemplary embodiment.

Figure 11:
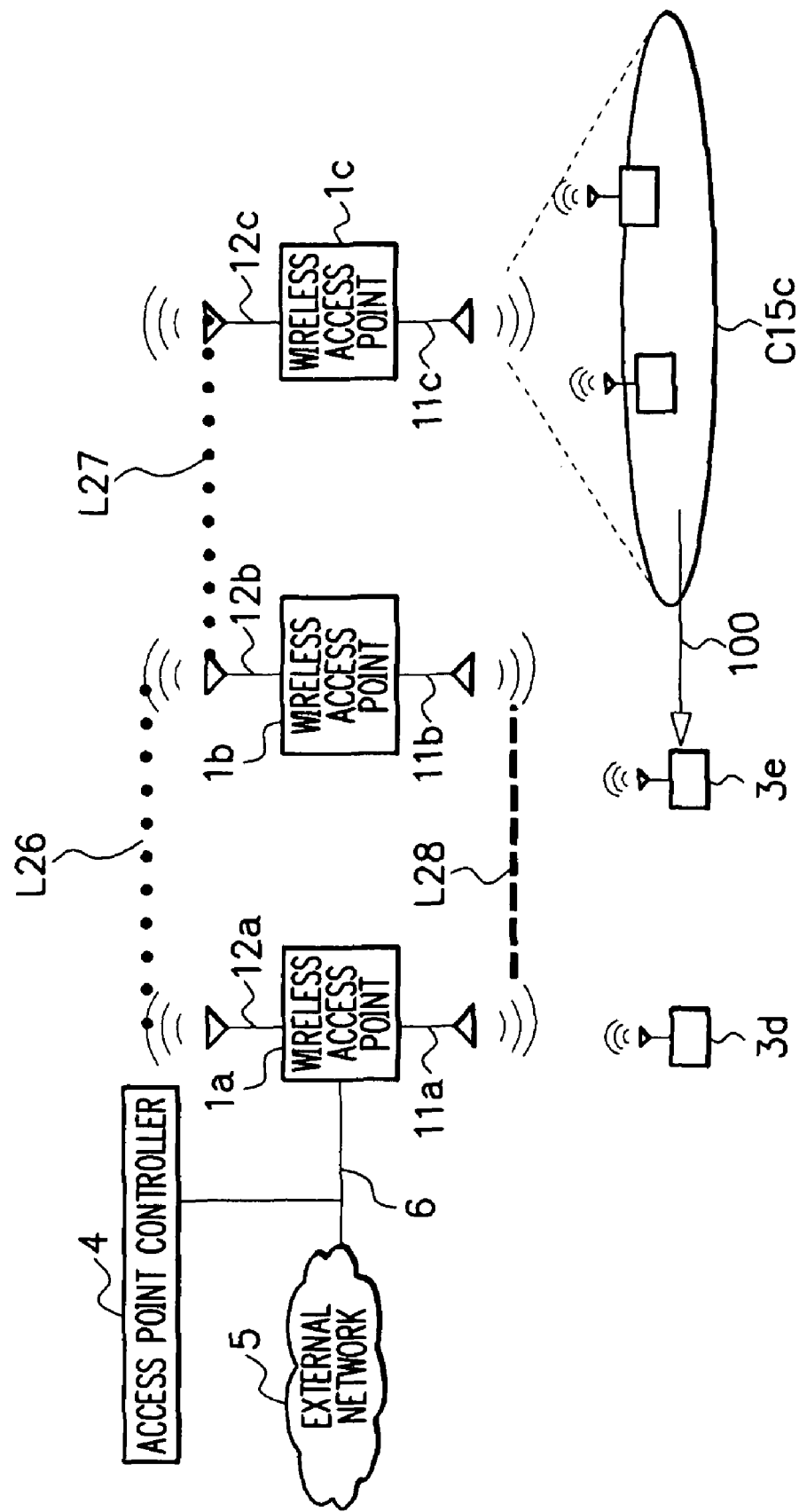
FIG. 11 is a block diagram showing an example of structure of the wireless LAN system.

FIG. 11 shows an example of the configuration of the exemplary embodiment. Referring to FIG. 11, the wireless LAN system includes an access point controller 4 to control operation of each access point 1 and access points 1 ($1a$, $1b$, $1c$, etc.) each of which including radio interfaces. The system is wirelessly communicable with stations 3 each including one wireless interface.

In the example of FIG. 11, each of the access points $1a$ to $1c$ includes two wireless interfaces 11 and 12.

In FIG. 11, the interfaces 11 and 12 respectively of the access points $1a$ and $1b$ and the interface $12c$ of the access point $1c$ construct backhaul radio links L26, L27, and L28. Therefore, the interface $11c$ of the access point $1c$ forms only one access link C15$c$ in the configuration of FIG. 11. A station $3d$ in FIG. 11 is an example of a station additionally installed in the wireless LAN system.

Also, a station $3e$ is an example of a station which moves from the communication range of the access link C15$c$ in the direction of an arrow 100 to a position outside the communication range.

In the configuration, the stations $3d$ and $3e$ can belong to the LAN system when the interface 11 or 12 set as a backhaul interface of the access points $1a$ and $1b$ includes a scheme to respond to a connection request from the stations $3d$ and $3e$ and a scheme to conduct the mode change to an access interface according to the connection request.

In FIG. 11, when the access point $1a$ conducts a mode change to alter the interface $11a$ to an access interface as described in conjunction with FIG. 8, the stations $3d$ and $3e$ can be accommodated in, namely, can be connected to the access station $1a$.

In another configuration, when the stations $3d$ and $3e$ include a connection scheme to connect to an access link of an access point, a scheme to retrieve an interface set as a backhaul interface to connect to the interface, and a scheme to conduct a mode change for an access interface and a backhaul interface, it is possible to additionally install the stations 3*d* and 3*e* in the LAN system.

Figure 12:
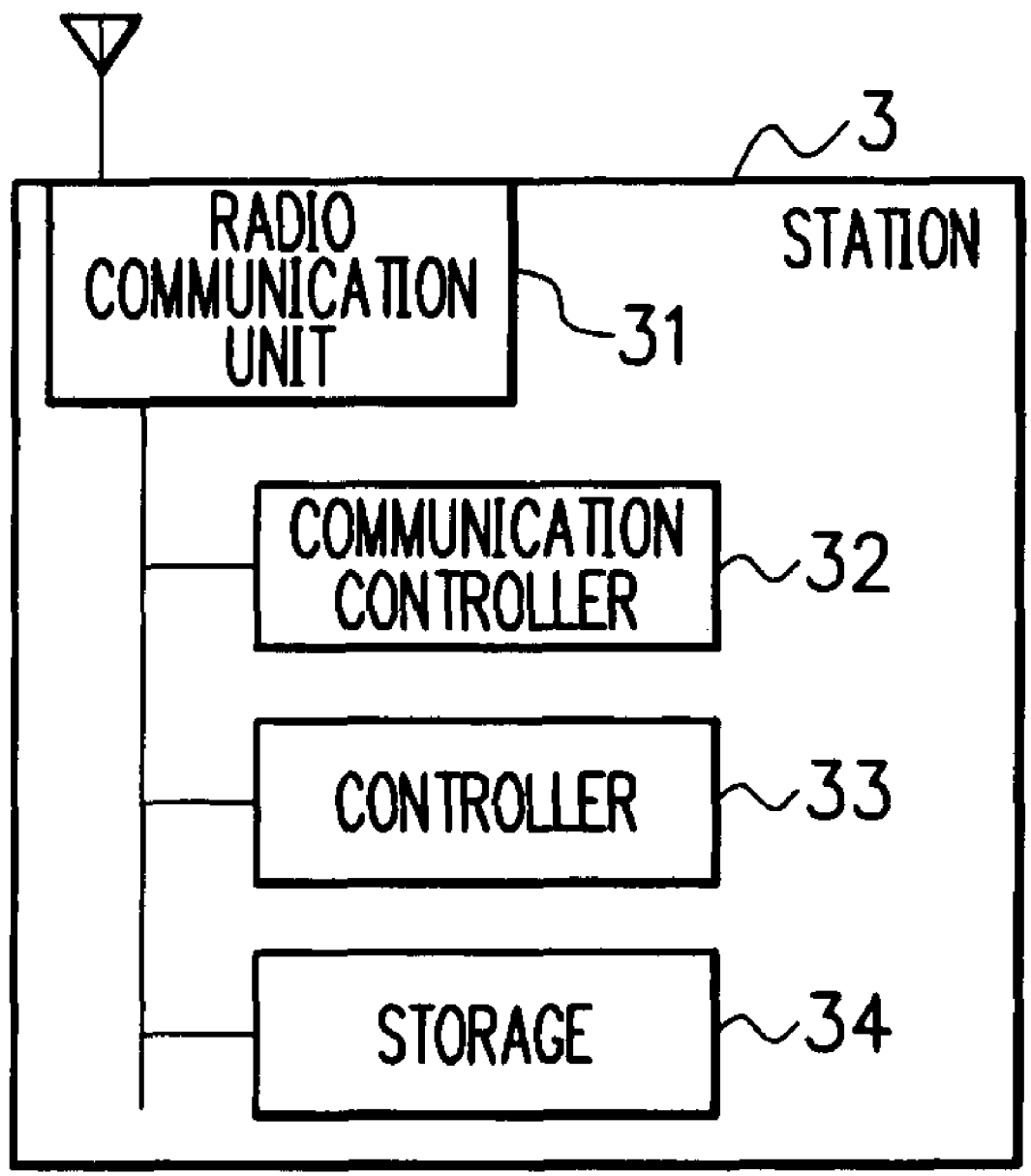
FIG. 12 is a block diagram showing a configuration example of a station 3.

In this situation, as FIG. 12 shows, the station 3 (3*d*, 3*e*) includes a radio communication unit 31 wirelessly communicable with a frequency to connect to an access link and a frequency to connect to a backhaul network, a communication control unit 32 to conduct communication control such as an operation of the unit 31 to retrieve an interface of a connection destination and an operation of the unit 31 to issue a connection request to an access point, a controller 33 to control the overall operation of the station 3, and a storage 34.

The communication control unit 32 conducts a control operation to change the frequency to be used by the communication unit 31 for communication connection to a frequency to connect to an access link or a frequency to connect to a backhaul network.

In the configuration example of FIG. 11, the communication connection is achievable when the station 3*d* creates a backhaul link with the interface 11*a* of the access point 1*a*.

The communication unit 31 of the station 3*e* attempts to retrieve a connection destination under control of the control unit 32. When it is recognized that the station 3*e* is beyond the communication range for the access link created by the access point, the communication unit 31 makes a search for an access link as a new connection destination and a search for a backhaul radio link. If the backhaul radio link is successfully retrieved, the control unit 32 of the station 3*e* changes the communication unit 31 to the backhaul mode. As a result, the station 3*e* can connect to the interface 11*a* of the access point 1*a* using a frequency of the backhaul radio link.

If the access link and the backhaul link are obtained in the retrieval, either one thereof may be used as the connection destination according to a determination criterion, for example, a criterion to select one of the links which has a smaller amount of traffic.

According to the third exemplary embodiment, the mode change can be conducted such that the wireless interface of an access point is varied to an access interface according to an access request from a station. Therefore, even if an access point of which all radio interfaces are operated as backhaul interfaces exists in the access points, there can be conducted operations without any problem, for example, a station can be additionally installed in the system and a handover request can be received from another station to change the access point to which the station belongs.

Therefore, even in a situation wherein the access points include, for example, an access point of which all radio interfaces are operated as backhaul interfaces, there can be obtained advantageous effects similar to those attained in the first and second exemplary embodiments.

When the station includes a connection scheme to connect to an access link of an access station and is configured to connect through a mode change to an interface set as a backhaul interface, even if an access point of which all radio interfaces are operated as backhaul interfaces exists in the access points, it is possible without any problem that the station additionally belongs to the access point. Also, it is possible that the station can change its access point to one of the access points from another access point.

As a result, even when the access points include, for example, an access point of which all radio interfaces are operated as backhaul interfaces, it is possible to attain advantages similar to those attained in the first and second exemplary embodiments.

First to Third Exemplary Embodiments

The first to third exemplary embodiments are only favorable embodiments. However, the present invention is not restricted by the embodiments, but exemplary embodiments can be changed and modified in various ways according to the technical idea of the present invention.

For example, the configuration examples of the first to third exemplary embodiments include three access points linearly installed with an equal distance therebetween for easy understanding of the embodiments. However, the number access points and the positions thereof may be determined according to necessity.

Also, for easy understanding of exemplary embodiments, the examples of configurations of the first to third exemplary embodiments include three stations. However, the number and locations of stations may be arbitrarily determined.

In each embodiment, the number of the access point controllers 4, that of the stations coupled with the access point 1, and that of the access points to conduct the mode change may be one or more than one.

In the description of the first to third exemplary embodiments, the methods of acquiring the communication range information, the traffic information, and the topology information are only examples used for easy explanation. The present invention is not restricted by the methods, but there may also be employed another method.

In the description of each embodiment, the access point controller is separated from the access points such that the access point controller to control each access points are connected by wire to the access points. However, only if the functions of the exemplary embodiments are implemented, the present invention is not restricted by the configuration. For example, it is also possible that each of the access points includes the function of the access point controller such that the access points are coupled by radio with each other.

That is, the present invention is similarly implemented even if the system is configured to carry out "distributed control operation" in which the access point 1 includes the control function of the access point controller 4 to control the access points and controls the access points according to the traffic information and the topology information regarding the access points connected to the access point 1.

The processing procedure to realize each of the embodiments of the wireless LAN system may be recorded as a program in a computer-readable medium. According to the program supplied from the computer-readable medium, the functions of each embodiment are carried out when the program is executed by a Central Processing Unit (CPU) of a computer constituting the system.

In this case, the present invention is also applicable by supplying a group of information items including the program to an output device via a recording medium or via a network from an external recording medium.

That is, the program code read from the computer-readable medium implements the novel functions of the present invention. The computer-readable medium having recorded the program code and signals attained from the computer-readable medium are also included in the scope of the present invention.

As the computer-readable medium, there may be adopted, for example, a floppy (registered trademark) disk, a hard disk, an optical disk, a magnetooptical disk, a Compact-Disk Read-Only Memory (CD-ROM), a CD-R, a magnetic tape, a non-volatile memory card, an ROM, or an Electrically Erasable Programmable ROM (EEPROM).

By use of the program, it is possible to make a computer supervised by the program implement the functions of the respective embodiments of the wireless LAN system.

The present invention is also applicable to various purposes to simply install a wide-range, wireless LAN network system.

Also, the present invention is applicable to a wireless LAN network system that requires mobility as well as high communication quality like that of audio communication using Voice over IP (VoIP) through a wireless LAN.

Fourth Exemplary Embodiment

It is favorable that the access point includes wireless connection units and the connection destination changeover unit conducts a changeover of the connection destination for at least one of the wireless connection units according to information of the connection state of each of the stations belonging to the access point.

Fifth Exemplary Embodiment

The connection destination changeover unit may make a check, before conducting the changeover of the connection destination by the wireless connection unit from the station to the access point, to determine whether there appears a station that is not connectible among the stations belonging to one of the access points in the wireless communication system based on the information of the connection state measured by the connection state measuring unit, and the connection destination changeover unit conducts the changeover operation if it is determined that there does not appear any station that is not connectible among the stations.

Sixth Exemplary Embodiment

The connection destination changeover unit may make a check, before conducting the changeover of the connection destination by the wireless connection unit from the station to the access point, to determine whether the stations belonging to one of the access points in the wireless communication system can be accommodated based on the information of the connection state measured by the connection state measuring unit, and the connection destination changeover unit conducts the changeover operation if it is determined that the stations are accommodated.

Seventh Exemplary Embodiment

It is desirable that the connection destination changeover unit makes a check, before conducting the changeover of the connection destination by the wireless connection unit from the station to the access point, to determine whether a band between the access points is improved based on the information of the connection state measured by the connection state measuring unit, and the connection destination changeover unit conducts the changeover operation if it is determined that the band is improved.

Eighth Exemplary Embodiment

Favorably, the connection destination changeover unit makes a check, before conducting the changeover of the connection destination by the wireless connection unit from the station to the access point, to determine whether there appears a station that is not connectible to the backbone network among the access points in the wireless communication system based on the information of the connection state measured by the connection state measuring unit, and the connection destination changeover unit conducts the changeover operation if it is determined that there does not appear any station that is not connectible to the backbone network.

Ninth Exemplary Embodiment

It is desirable that the connection destination changeover unit makes a check, before conducting the changeover of the connection destination by the wireless connection unit from the station to the access point, to determine whether a band between the access points is within a predetermined range for an amount of traffic of the stations belonging to one of the access stations in the wireless communication system based on the information of the connection state measured by the connection state measuring unit, and the connection destination changeover unit conducts the changeover operation if it is determined that the band is within the range.

Tenth Exemplary Embodiment

The connection destination changeover unit desirably makes a check, before conducting the changeover of the connection destination by the wireless connection unit from the station to the access point, to determine whether a total of bands used by the access points in the wireless communication system to connect stations is improved on the basis of the information of the connection state measured by the connection state measuring unit, and the connection destination changeover unit conducts the changeover operation if it is determined that the total is improved.

Eleventh Exemplary Embodiment

Desirably, the connection changeover unit starts connection destination changeover processing to conduct the changeover of the connection destination in the wireless connection unit if it is determined that communication quality of the system is less than a predetermined threshold value on the basis of the information of the connection state measured by the connection state measuring unit.

Twelfth Exemplary Embodiment

It is favorable that the connection changeover unit starts connection destination changeover processing to conduct the changeover of the connection destination in the wireless connection unit if it is determined that communication quality of the system is less than a predetermined threshold value on the basis of setting information of communication ranges connectible by wireless communication with other devices.

Thirteenth Exemplary Embodiment

The connection state desirably includes at least one of traffic information and topology information.

Fourteenth Exemplary Embodiment

It is favorable that the access point includes a request responding unit that responds to a connection request from a station even if a connection destination has been set to the access point by the wireless connection unit and the access point starts connection destination changeover processing to conduct the changeover of the connection destination in the wireless connection unit if the request responding unit receives a connection request from a station.

Fifteenth Exemplary Embodiment

Desirably, the station includes a multi-frequency connection unit connectible not only when a connection destination of the wireless connection unit of the access point is a station but also when the connection destination is an access point and a target changeover unit for conducting a changeover operation for a connection target of the multi-frequency connection unit between a wireless connection unit for connection to a station and a wireless connection unit for connection between access points.

Sixteenth Exemplary Embodiment

It is desirable that the access point includes wireless connection units and the connection destination changeover unit conducts a changeover of the connection destination for at least one of the wireless connection units according to information of the connection state of each of the stations belonging to the access point.

Seventeenth Exemplary Embodiment

Favorably, the connection destination changeover unit makes a check, before conducting the changeover of the connection destination by the wireless connection unit from the station to the access point, to determine whether there appears a station that is not connectible among the stations belonging to one of the access points connected to the system controller on the basis of the information of the connection state measured by the connection state measuring unit, and the connection destination changeover unit conducts the changeover operation if it is determined that there does not appear any station that is not connectible among the stations.

Eighteenth Exemplary Embodiment

It is desirable that the connection destination changeover unit makes a check, before conducting the changeover of the connection destination by the wireless connection unit from the station to the access point, to determine whether the stations belonging to one of the access points connected to the system controller are accommodated on the basis of the information of the connection state measured by the connection state measuring unit, and the connection destination changeover unit conducts the changeover operation if it is determined that the stations are accommodated.

Nineteenth Exemplary Embodiment

The connection destination changeover unit favorably makes a check, before conducting the changeover of the connection destination by the wireless connection unit from the station to the access point, to determine whether a band between the access points is improved on the basis of the information of the connection state received by the access point information receiving unit, and the connection destination changeover unit conducts the changeover operation if it is determined that the band is improved.

Twentieth Exemplary Embodiment

Desirably, the connection destination changeover unit makes a check, before conducting the changeover of the connection destination by the wireless connection unit from the station to the access point, to determine whether there appears a station that is not connectible to the backbone network among the access points connected to the system controller on the basis of the information of the connection state received by the access point information receiving unit, and the connection destination changeover unit conducts the changeover operation if it is determined that there does not appear any station that is not connectible to the backbone network.

Twenty-First Exemplary Embodiment

It is desirable that the connection destination changeover unit makes a check, before conducting the changeover of the connection destination by the wireless connection unit from the station to the access point, to determine whether a band between the access points is within a predetermined range for an amount of traffic of the stations belonging to one of the access stations connected to the system controller on the basis of the information of the connection state received by the access point information receiving unit, and the connection destination changeover unit conducts the changeover operation if it is determined that the band is within the range.

Twenty-Second Exemplary Embodiment

Desirably, the connection destination changeover unit makes a check, before conducting the changeover of the connection destination by the wireless connection unit from the station to the access point, to determine whether a total of bands used by the access points connected to the system controller to connect stations is improved on the basis of the information of the connection state received by the access point information receiving unit, and the connection destination changeover unit conducts the changeover operation if it is determined that the total is improved.

Twenty-Third Exemplary Embodiment

Favorably, the connection changeover unit starts connection destination changeover processing to conduct the changeover of the connection destination in the wireless connection unit if it is determined that communication quality of the system is less than a predetermined threshold value on the basis of the information of the connection state received by the access point information receiving unit.

Twenty-Fourth Exemplary Embodiment

The connection changeover unit favorably starts connection destination changeover processing to conduct the changeover of the connection destination in the wireless connection unit if it is determined that communication quality in the access point is less than a predetermined threshold value on the basis of setting information of communication ranges wirelessly connectible in the access point with other devices.

Twenty-Fifth Exemplary Embodiment

The connection state favorably includes at least one of traffic information and topology information.

Twenty-Sixth Exemplary Embodiment

The connection state desirably includes at least one of traffic information and topology information.

Twenty-Seventh Exemplary Embodiment

It is favorable that the access point further includes a request responding unit for responding to a connection request from a station even if a connection destination has been set to the access point by the wireless connection unit.

Twenty-Eighth Exemplary Embodiment

Favorably, the access point includes wireless connection units and the connection destination changeover unit conducting a changeover of the connection destination for at least one of the wireless connection units according to information of the connection state of each of the stations belonging to the access point.

Twenty-Ninth Exemplary Embodiment

It is desirably that the connection destination changeover unit makes a check, before conducting the changeover of the connection destination by the wireless connection unit from the station to the access point, to determine whether there appears a station that is not connectible among the stations belonging to one of the access points connected to the access point on the basis of the information of the connection state measured by the connection state measuring unit, and the connection destination changeover unit conducts the changeover operation if it is determined that there does not appear any station which is not connectible among the stations.

Thirtieth Exemplary Embodiment

Desirably, the connection destination changeover unit makes a check, before conducting the changeover of the connection destination by the wireless connection unit from the station to the access point, to determine whether the stations belonging to one of the access points connected to the access point are accommodated on the basis of the information of the connection state measured by the connection state measuring unit, and the connection destination changeover unit conducts the changeover operation if it is determined that the stations are accommodated.

Thirty-First Exemplary Embodiment

Favorably, the access point further includes a band measuring unit that measures, during the operation to conduct the changeover of the connection destination by the wireless connection unit between a station to an access point, a band between access points on the basis of the information of the connection state measured by the connection state measuring unit.

Thirty-Second Exemplary Embodiment

The connection destination changeover unit desirably makes a check, before conducting the changeover of the connection destination by the wireless connection unit from the station to the access point, to determine whether there appears a station that is not connectible to the backbone network among the access points connected to the access point on the basis of the information of the connection state measured by the connection state measuring unit, and the connection destination changeover unit conducts the changeover operation if it is determined that there does not appear any station that is not connectible to the backbone network.

Thirty-Third Exemplary Embodiment

It is favorable that the connection destination changeover unit makes a check, before conducting the changeover of the connection destination by the wireless connection unit from the station to the access point, to determine whether a band between the access points is within a predetermined range for an amount of traffic of the stations belonging to one of the access stations connected to the access point on the basis of the information of the connection state measured by the connection state measuring unit, and the connection destination changeover unit conducts the changeover operation if it is determined that the band is within the range.

Thirty-Fourth Exemplary Embodiment

Desirably, the connection destination changeover unit makes a check, before conducting the changeover of the connection destination by the wireless connection unit from the station to the access point, to determine whether a total of bands used by the access points connected to the access point to connect stations is improved on the basis of the information of the connection state measured by the connection state measuring unit, and the connection destination changeover unit conducts the changeover operation if it is determined that the total is improved.

Thirty-Fifth Exemplary Embodiment

The connection changeover unit desirably starts connection destination changeover processing to conduct the changeover of the connection destination in the wireless connection unit if it is determined that communication quality of the system is less than a predetermined threshold value on the basis of the information of the connection state measured by the connection state measuring unit.

Thirty-Sixth Exemplary Embodiment

The connection changeover unit desirably starts connection destination changeover processing to conduct the changeover of the connection destination in the wireless connection unit if it is determined that communication quality of the system is less than a predetermined threshold value on the basis of setting information of communication ranges connectible by wireless communication with other devices.

Thirty-Seventh Exemplary Embodiment

Favorably, the connection state includes at least one of traffic information and topology information.

Thirty-Eighth Exemplary Embodiment

Desirably, the access point further includes a request responding unit for responding to a connection request from a station even if a connection destination has been set to the access point by the wireless connection unit, and the access point starts connection destination changeover processing to conduct the changeover of the connection destination in the wireless connection unit if the request responding unit receives a connection request from a station.

Thirty-Ninth Exemplary Embodiment

It is desirable that the access point includes wireless connection units and the connection destination changeover step conducts a changeover of the connection destination for at least one of the wireless connection units according to information of the connection state of each of the stations belonging to the access point.

Fortieth Exemplary Embodiment

Favorably, the connection destination changeover step makes a check, before conducting the changeover of the connection destination by the wireless connection unit from the station to the access point, to determine whether there appears a station that is not connectible among the stations belonging to one of the access points in the wireless communication system on the basis of the information of the connection state measured by the connection state measuring step; and the connection destination changeover step conducts the changeover operation if it is determined that there does not appear any station that is not connectible among the stations.

Forty-First Exemplary Embodiment

It is desirable that the connection destination changeover step makes a check, before conducting the changeover of the connection destination by the wireless connection unit from the station to the access point, to determine whether the stations belonging to one of the access points in the wireless communication system are accommodated on the basis of the information of the connection state measured by the connection state measuring step; and the connection destination changeover step conducts the changeover operation if it is determined that the stations are accommodated.

Forty-Second Exemplary Embodiment

Favorably, the connection destination changeover step makes a check, before conducting the changeover of the connection destination by the wireless connection unit from the station to the access point, to determine whether a band between the access points is improved on the basis of the information of the connection state measured by the connection state measuring step; and the connection destination changeover step conducts the changeover operation if it is determined that the band is improved.

Forty-Third Exemplary Embodiment

Desirably, the connection destination changeover step makes a check, before conducting the changeover of the connection destination by the wireless connection unit from the station to the access point, to determine whether there appears a station that is not connectible to the backbone network among the access points in the wireless communication system on the basis of the information of the connection state measured by the connection state measuring step; and the connection destination changeover step conducts the changeover operation if it is determined that there does not appear any station that is not connectible to the backbone network.

Forty-Fourth Exemplary Embodiment

The connection destination changeover step favorably makes a check, before conducting the changeover of the connection destination by the wireless connection unit from the station to the access point, to determine whether a band between the access points is within a predetermined range for an amount of traffic of the stations belonging to one of the access stations in the wireless communication system on the basis of the information of the connection state measured by the connection state measuring step; and the connection destination changeover step conducts the changeover operation if it is determined that the band is within the range.

Forty-Fifth Exemplary Embodiment

Favorably, the connection destination changeover step makes a check, before conducting the changeover of the connection destination by the wireless connection unit from the station to the access point, to determine whether a total of bands used by the access points in the wireless communication system to connect stations is improved on the basis of the information of the connection state measured by the connection state measuring step; and the connection destination changeover step conducts the changeover operation if it is determined that the total is improved.

Forty-Sixth Exemplary Embodiment

The connection changeover step is desirably started if it is determined that communication quality of the system is less than a predetermined threshold value on the basis of the information of the connection state measured by the connection state measuring step.

Forty-Seventh Exemplary Embodiment

Favorably, the connection changeover step is started if it is determined that communication quality of the system is less than a predetermined threshold value on the basis of setting information of communication ranges connectible by wireless communication with other devices.

Forty-Eighth Exemplary Embodiment

It is favorable that the communication control method further includes the request responding step of responding to a connection request from a station even if a connection destination has been set to the access point by the wireless connection unit, and the connection destination changeover step is started if the request responding step receives a connection request from a station.

Forty-Ninth Exemplary Embodiment

Desirably, the connection state includes at least one of traffic information and topology information.

Fiftieth Exemplary Embodiment

In the communication control method, the station favorably includes a multi-frequency connection unit connectible not only when a connection destination of the wireless connection unit of the access point is a station but also when the connection destination is an access point.

Fifty-First Exemplary Embodiment

It is desirable that the communication control method includes the connection destination search step for searching for one of the wireless connection units which is connectible to the multi-frequency connection unit; and the target changeover step for conducting, according to a result of the connection destination search step, a changeover operation for a connection target of the multi-frequency connection unit between a wireless connection unit for connection to a station and a wireless connection unit for connection between access points.

Fifty-Second Exemplary Embodiment

Favorably, the access point includes wireless connection units and the connection destination changeover processing conducts a changeover of the connection destination for at least one of the wireless connection units according to information of the connection state of each of the stations belonging to the access point.

Fifty-Third Exemplary Embodiment

The connection destination changeover processing desirably makes a check, before conducting the changeover of the connection destination by the wireless connection unit from the station to the access point, to determine whether there appears a station that is not connectible among the stations belonging to one of the access points in the wireless communication system on the basis of the information of the connection state measured by the connection state measuring processing; and the connection destination changeover processing conducts the changeover operation if it is determined that there does not appear any station which is not connectible among the stations.

Fifty-Fourth Exemplary Embodiment

The connection destination changeover processing desirably makes a check, before conducting the changeover of the connection destination by the wireless connection unit from the station to the access point, to determine whether the stations belonging to one of the access points in the wireless communication system are accommodated on the basis of the information of the connection state measured by the connection state measuring processing; and the connection destination changeover unit conducts the changeover operation if it is determined that the stations can be accommodated.

Fifty-Fifth Exemplary Embodiment

It is favorable that the connection destination changeover processing makes a check, before conducting the changeover of the connection destination by the wireless connection unit from the station to the access point, to determine whether a band between the access points is improved on the basis of the information of the connection state measured by the connection state measuring processing; and the connection destination changeover processing conducts the changeover operation if it is determined that the band is improved.

Fifty-Sixth Exemplary Embodiment

Desirably, the connection destination changeover processing makes a check, before conducting the changeover of the connection destination by the wireless connection unit from the station to the access point, to determine whether there appears a station that is not connectible to the backbone network among the access points in the wireless communication system on the basis of the information of the connection state measured by the connection state measuring processing; and the connection destination changeover processing conducts the changeover operation if it is determined that there does not appear any station which is not connectible to the backbone network.

Fifty-Seventh Exemplary Embodiment

The connection destination changeover processing favorably makes a check, before conducting the changeover of the connection destination by the wireless connection unit from the station to the access point, to determine whether a band between the access points is within a predetermined range for an amount of traffic of the stations belonging to one of the access stations in the wireless communication system on the basis of the information of the connection state measured by the connection state measuring processing; and the connection destination changeover processing conducts the changeover operation if it is determined that the band is within the range.

Fifty-Eighth Exemplary Embodiment

The connection destination changeover processing favorably makes a check, before conducting the changeover of the connection destination by the wireless connection unit from the station to the access point, to determine whether a total of bands used by the access points in the wireless communication system to connect stations is improved on the basis of the information of the connection state measured by the connection state measuring processing; and the connection destination changeover processing conducts the changeover operation if it is determined that the total is improved.

Fifty-Ninth Exemplary Embodiment

Favorably, the connection changeover processing is started if it is determined that communication quality of the system is less than a predetermined threshold value on the basis of the information of the connection state measured by the connection state measuring processing.

Sixtieth Exemplary Embodiment

It is desirable that the connection changeover processing is started if it is determined that communication quality of the system is less than a predetermined threshold value on the basis of setting information of communication ranges connectible by wireless communication with other devices.

Sixty-First Exemplary Embodiment

It is desirable that the computer-readable medium storing the communication control program further causes a computer to perform request responding processing for responding to a connection request from a station even if a connection destination has been set to the access point by the wireless connection unit, and the connection destination changeover processing is started if the request responding processing receives a connection request from a station.

Sixty-Second Exemplary Embodiment

Desirably, the connection state includes at least one of traffic information and topology information.

Sixty-Third Exemplary Embodiment

Favorably, the station includes a multi-frequency connection unit connectible not only when a connection destination of the wireless connection unit of the access point is a station but also when the connection destination is an access point.

Sixty-Fourth Exemplary Embodiment

It is desirable that the communication control program further causes a computer to perform connection destination search processing for searching for one of the wireless connection units that is connectible to the multi-frequency connection unit and target changeover processing for conducting, according to a result of the connection destination search processing, a changeover operation for a connection target of the multi-frequency connection unit between a wireless connection unit for connection to a station and a wireless connection unit for connection between access points.

An exemplary advantage according to the invention is that based on the state of connection of each station belonging to an access point, the setting of the connection destination is dynamically and autonomously changed in the wireless interfaces.

As a result, the limited wireless interfaces are efficiently used without requiring the user to accomplish a complicated setting operation. This advantageously leads to the increase in the number of stations simultaneously connectible to an access point and the improvement of the communication quality.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A wireless communication system, comprising
    access points each including a wireless connection unit to wirelessly connect to other devices, where at least one access point is connected wirelessly to a backbone network,
    a connection state measuring unit that measures a connection state of a station belonging to one of the access points; and
    a connection destination changeover unit that determines whether a mode of a wireless interface is for a backhaul interface or for an access interface, according to information of the connection state measured by the connection state measuring unit, and that conducts a changeover of a connection destination used by the wireless connection unit between an access point and a station according to information of the connection state measured by the connection state measuring unit.

2. The wireless communication system in accordance with claim 1, wherein:
    an access point includes wireless connection units; and
    the connection destination changeover unit conducts a changeover of the connection destination for at least one of the wireless connection units according to information of the connection state of each of the stations.

3. The wireless communication system in accordance with claim 1, wherein:
    the connection destination changeover unit makes a check, before conducting the changeover of the connection destination by the wireless connection unit from the station to the access point, to determine whether there appears a station that is not connectible among the stations belonging to one of the access points in the wireless communication system on a basis of the information of the connection state measured by the connection state measuring unit; and
    the connection destination changeover unit conducts a changeover operation if it is determined that there does not appear to be any station that is not connectible among the stations.

4. The wireless communication system in accordance with claim 1, wherein:
    the connection destination changeover unit makes a check, before conducting the changeover of the connection destination by the wireless connection unit from the station to the access point, to determine whether the stations belonging to one of the access points in the wireless communication system are accommodated, based on the information of the connection state measured by the connection state measuring unit; and
    the connection destination changeover unit conducts the changeover operation if it is determined that the stations are accommodated.

5. The wireless communication system in accordance with claim 1, wherein:
    the connection destination changeover unit makes a check, before conducting the changeover of the connection destination by the wireless connection unit from the station to the access point, to determine whether a band between the access points is improved, based on the information of the connection state measured by the connection state measuring unit; and
    the connection destination changeover unit conducts the changeover operation if it is determined that the band is improved.

6. The wireless communication system in accordance with claim 1, wherein:
    the connection destination changeover unit makes a check, before conducting the changeover of the connection destination by the wireless connection unit from the station to the access point, to determine whether there appears a station that is not connectible to the backbone network among the access points in the wireless communication system, based on the information of the connection state measured by the connection state measuring unit; and
    the connection destination changeover unit conducts the changeover operation if it is determined that there does not appear to be any station that is not connectible to the backbone network.

7. The wireless communication system in accordance with claim 1, wherein:
    the connection destination changeover unit makes a check, before conducting the changeover of the connection destination by the wireless connection unit from the station to the access point, to determine whether a band between the access points is within a predetermined range for an amount of traffic of the stations belonging to one of the access stations in the wireless communication system, based on the information of the connection state measured by the connection state measuring unit; and
    the connection destination changeover unit conducts the changeover operation if it is determined that the band is within the range.

8. The wireless communication system in accordance with claim 1, wherein:
    the connection destination changeover unit makes a check, before conducting the changeover of the connection destination by the wireless connection unit from the station to the access point, to determine whether a total of bands used by the access points in the wireless communication system to connect stations is improved, based on the information of the connection state measured by the connection state measuring unit; and the connection destination changeover unit conducts the changeover operation if it is determined that the total is improved.

9. The wireless communication system in accordance with claim 1, wherein the connection changeover unit starts a connection destination changeover processing to conduct the changeover of the connection destination in the wireless connection unit if it is determined that a communication quality of the system is less than a predetermined threshold value, based on the information of the connection state measured by the connection state measuring unit.

10. A wireless communication system in accordance with claim 1, wherein the connection changeover unit starts a connection destination changeover processing to conduct the changeover of the connection destination in the wireless connection unit if it is determined that a communication quality of the system is less than a predetermined threshold value on a basis of setting information of communication ranges connectible by wireless communication with other devices.

11. The wireless communication system in accordance with claim 1, wherein the connection state includes at least one of traffic information and topology information.

12. The wireless communication system in accordance with claim 1, wherein:
the access point includes a request responding unit that responds to a connection request from a station even if a connection destination has been set to the access point by the wireless connection unit; and
the access point starts a connection destination changeover processing to conduct the changeover of the connection destination in the wireless connection unit if the request responding unit receives a connection request from a station.

13. The wireless communication system in accordance with claim 1, wherein the station comprises:
a multi-frequency connection unit connectible not only when a connection destination of the wireless connection unit of the access point comprises a station but also when the connection destination comprises an access point; and
a target changeover unit that conducts a changeover operation for a connection target of the multi-frequency connection unit between a wireless connection unit for connection to a station and a wireless connection unit for connection between access points.

14. A wireless communication system, comprising:
access points each including a wireless connection unit to wirelessly connect to other devices where at least one access point is connected wirelessly to a backbone network;
connection state measuring means for measuring a connection state of a station belonging to one of the access points;
connection destination changeover determining means for determining whether a mode of a wireless interface is for a backhaul interface or for an access interface, according to information of the connection state measured by the connection state measuring unit; and
connection destination changeover means for conducting a changeover of a connection destination used by the wireless connection means between an access point and a station according to information of the connection state measured by the connection state measuring means.

15. A system controller communicating with access points, the access points each including a wireless connection unit to wirelessly connect to other devices where at least one access point is connected wirelessly to a backbone network, the system controller comprising:
an access point information receiving unit that receives information of a connection state with stations belonging to one of the access points, the information being measured by the access points; and
a connection destination changeover unit that determines whether a mode of a wireless interface is for a backhaul interface or for an access interface, according to information of the connection state measured by the connection state measuring unit, and that conducts a changeover of a connection destination used by the wireless connection unit between an access point and a station according to the information of the connection state received by the access point information receiving unit.

16. The system controller in accordance with claim 15, wherein:
the access point includes one or more wireless connection units; and
the connection destination changeover unit conducts a changeover of the connection destination for at least one of the wireless connection units according to information of the connection state of each of the stations belonging to the access point.

17. The system controller in accordance with claim 15, wherein:
the connection destination changeover unit makes a check, before conducting the changeover of the connection destination by the wireless connection unit from the station to the access point, to determine whether there appears a station that is not connectible among the stations belonging to one of the access points connected to the system controller, based on the information of the connection state measured by the connection state measuring unit; and
the connection destination changeover unit conducts the changeover operation if it is determined that there does not appear any station that is not connectible among the stations.

18. The system controller in accordance with claim 15, wherein:
the connection destination changeover unit makes a check, before conducting the changeover of the connection destination by the wireless connection unit from the station to the access point, to determine whether the stations belonging to one of the access points connected to the system controller are accommodated, based on the information of the connection state measured by the connection state measuring unit; and
the connection destination changeover unit conducts the changeover operation if it is determined that the stations are accommodated.

19. The system controller in accordance with claim 15, wherein:
the connection destination changeover unit makes a check, before conducting the changeover of the connection destination by the wireless connection unit from the station to the access point, to determine whether a band between the access points is improved, based on the information of the connection state received by the access point information receiving unit; and
the connection destination changeover unit conducts the changeover operation if it is determined that the band is improved.

20. The system controller in accordance with claim 15, wherein:
the connection destination changeover unit makes a check, before conducting the changeover of the connection destination by the wireless connection unit from the station to the access point, to determine whether there appears a station that is not connectible to the backbone network among the access points connected to the system controller, based on the information of the connection state received by the access point information receiving unit; and
the connection destination changeover unit conducts the changeover operation if it is determined that there does not appear any station that is not connectible to the backbone network.

21. The system controller in accordance with claim 15, wherein:
the connection destination changeover unit makes a check, before conducting the changeover of the connection destination by the wireless connection unit from the station to the access point, to determine whether a band between the access points is within a predetermined range for an amount of traffic of the stations belonging to one of the access stations connected to the system controller, based on the information of the connection state received by the access point information receiving unit; and
the connection destination changeover unit conducts the changeover operation if it is determined that the band is within the range.

22. The system controller in accordance with claim 15, wherein:
the connection destination changeover unit makes a check, before conducting the changeover of the connection destination by the wireless connection unit from the station to the access point, to determine whether a total of bands used by the access points connected to the system controller to connect stations is improved, based on the information of the connection state received by the access point information receiving unit; and
the connection destination changeover unit conducts the changeover operation if it is determined that the total is improved.

23. The system controller in accordance with claim 15, wherein the connection changeover unit starts a connection destination changeover processing to conduct the changeover of the connection destination in the wireless connection unit if it is determined that a communication quality of the system is less than a predetermined threshold value, based on the information of the connection state received by the access point information receiving unit.

24. The system controller in accordance with claim 15, wherein the connection changeover unit starts a connection destination changeover processing to conduct the changeover of the connection destination in the wireless connection unit if it is determined that a communication quality in the access point is less than a predetermined threshold value, based on setting information of communication ranges wirelessly connectible in the access point with other devices.

25. The system controller in accordance with claim 15, wherein the connection state includes at least one of traffic information and topology information.

26. A system controller connected in use with access points, the access points each including a wireless connection unit to wirelessly connect to other devices where at least one access point is connected wirelessly to a backbone network, the system controller comprising:

access point information receiving means for receiving information of a connection state with stations belonging to one of the access points, the information being measured by the access points;
connection destination changeover determining means for determining whether a mode of a wireless interface is for a backhaul interface or for an access interface, according to information of the connection state measured by the connection state measuring unit; and
connection destination changeover means for conducting a changeover of a connection destination used by the wireless connection means between an access point and a station according to the information of the connection state received by the access point information receiving means.

27. An access point communicating with a system controller controlling operation of the access point, the access point comprising:
a wireless connection unit to wirelessly connect to other devices;
a connection state measuring unit that measures a connection state of a station belonging to the access point;
a connection state transmitting unit that transmits information of the connection state measured by the connection state measuring unit to the system controller; and
a connection destination changeover unit that determines whether a mode of a wireless interface is for a backhaul interface or for an access interface, according to information of the connection state measured by the connection state measuring unit, and that conducts, at a reception of a change instruction from the system controller according to the information of the connection state, a changeover of a connection destination used by the wireless connection unit between an access point and a station.

28. The access point in accordance with claim 27, comprising wireless connection units,
the connection destination changeover unit conducting, according to the change instruction from the system controller, a changeover of the connection destination for at least one of the wireless connection units associated with the change instruction.

29. The access point in accordance with claim 27, wherein the connection state includes at least one of traffic information and topology information.

30. The access point in accordance with claim 27, further comprising a request responding unit that responds to a connection request from a station even if a connection destination has been set to the access point by the wireless connection unit.

31. An access point communicating with a system controller controlling operation of the access point, the access point comprising:
wireless connection means to wirelessly connect to other devices;
connection state measuring means for measuring a connection state of a station belonging to the access point;
connection state transmitting means for transmitting information of the connection state measured by the connection state measuring means to the system controller;
connection destination determining means for determining whether a mode of a wireless interface is for a backhaul interface or for an access interface, according to information of the connection state measured by the connection state measuring unit; and
connection destination changeover means for conducting, at a reception of a change instruction from the system controller according to the information of the connection state, a changeover of a connection destination used by the wireless connection means between an access point and a station.

32. An access point comprising:
a wireless connection unit to wirelessly connect to other devices, the access point being connected via the wireless connection unit to other access points;
a connection state measuring unit that measures a connection state of a station belonging to each access point connected to the access point; and
a connection destination changeover unit that determines whether a mode of a wireless interface is for a backhaul interface or for an access interface, according to information of the connection state measured by the connection state measuring unit, and that conducts a changeover of a connection destination used by the wireless connection unit between an access point and a station according to information of the connection state measured by the connection state measuring unit.

33. The access point in accordance with claim 32, comprising wireless connection units,
the connection destination changeover unit conducting a changeover of the connection destination for at least one of the wireless connection units according to information of the connection state of each of the stations belonging to the access point.

34. The access point in accordance with claim 32, wherein:
the connection destination changeover unit makes a check, before conducting the changeover of the connection destination by the wireless connection unit from the station to the access point, to determine whether there appears a station that is not connectible among the stations belonging to one of the access points connected to the access point, based on the information of the connection state measured by the connection state measuring unit; and
the connection destination changeover unit conducts a changeover operation if it is determined that there does not appear to be any station that is not connectible among the stations.

35. The access point in accordance with claim 32, wherein:
the connection destination changeover unit makes a check, before conducting the changeover of the connection destination by the wireless connection unit from the station to the access point, to determine whether the stations belonging to one of the access points connected to the access point are accommodated, based on the information of the connection state measured by the connection state measuring unit; and
the connection destination changeover unit conducts the changeover operation if it is determined that the stations are accommodated.

36. The access point in accordance with claim 32, further comprising a band measuring unit that measures, during the operation to conduct the changeover of the connection destination by the wireless connection unit between a station to an access point, a band between access points, based on the information of the connection state measured by the connection state measuring unit.

37. The access point in accordance with claim 32, wherein:
the connection destination changeover unit makes a check, before conducting the changeover of the connection destination by the wireless connection unit from the station to the access point, to determine whether there appears a station that is not connectible to the backbone network among the access points connected to the access point, based on the information of the connection state measured by the connection state measuring unit; and
the connection destination changeover unit conducts a changeover operation if it is determined that there does not appear any station that is not connectible to the backbone network.

38. The access point in accordance with claim 32, wherein:
the connection destination changeover unit makes a check, before conducting the changeover of the connection destination by the wireless connection unit from the station to the access point, to determine whether a band between the access points is within a predetermined range for an amount of traffic of the stations belonging to one of the access stations connected to the access point, based on the information of the connection state measured by the connection state measuring unit; and
the connection destination changeover unit conducts a changeover operation if it is determined that the band is within the range.

39. The access point in accordance with claim 32, wherein:
the connection destination changeover unit makes a check, before conducting the changeover of the connection destination by the wireless connection unit from the station to the access point, to determine whether a total of bands used by the access points connected to the access point to connect stations is improved, based on the information of the connection state measured by the connection state measuring unit; and
the connection destination changeover unit conducts a changeover operation if it is determined that the total is improved.

40. The access point in accordance with claim 32, wherein the connection changeover unit starts a connection destination changeover processing to conduct the changeover of the connection destination in the wireless connection unit if it is determined that a communication quality of the system is less than a predetermined threshold value, based on the information of the connection state measured by the connection state measuring unit.

41. The access point in accordance with claim 32, wherein the connection changeover unit starts a connection destination changeover processing to conduct the changeover of the connection destination in the wireless connection unit if it is determined that a communication quality of the system is less than a predetermined threshold value on a basis of setting information of communication ranges connectible by wireless communication with other devices.

42. The access point in accordance with claim 32, wherein the connection state includes at least one of traffic information and topology information.

43. The access point in accordance with claim 32, further comprising a request responding unit that responds to a connection request from a station even if a connection destination has been set to the access point by the wireless connection unit,
the access point starting connection destination changeover processing to conduct the changeover of the connection destination in the wireless connection unit if the request responding unit receives a connection request from a station.

44. An access point, comprising:
wireless connection means to wirelessly connect to other devices, the access point being connected via the wireless connection means to other access points;
connection state measuring means for measuring a connection state of connection of a station belonging to each access point connected to the access point;

connection destination changeover determining means for determining whether a mode of a wireless interface is for a backhaul interface or for an access interface, according to information of the connection state measured by the connection state measuring unit; and connection destination changeover means for conducting a changeover of a connection destination used by the wireless connection means between an access point and a station according to information of the connection state measured by the connection state measuring means.

45. A station communicable with an access point comprising a wireless connection unit to wirelessly connect to other devices, said station comprising:

a multi-frequency connection unit connectible not only when a connection destination of the wireless connection unit of the access point comprises a station but also when the connection destination comprises an access point;

a connection destination changeover unit that determines whether a mode of a wireless interface is for a backhaul interface or for an access interface, according to information of the connection state measured by the connection state measuring unit; and a target changeover unit for conducting a changeover of a connection target of the multi-frequency connection unit between a wireless connection unit for connection to a station and a wireless connection unit for connection between access points.

46. A station communicable with an access point comprising wireless connection means to wirelessly connect to other devices, said station comprising:

multi-frequency connection means connectible not only when a connection destination of the wireless connection means of the access point comprises a station but also when the connection destination comprises an access point;

a connection destination changeover determining means for determining whether a mode of a wireless interface is for a backhaul interface or for an access interface, according to information of the connection state measured by the connection state measuring unit; and target changeover means for conducting a changeover of a connection target of the multi-frequency connection means between wireless connection means for connection to a station and wireless connection means for connection between access points.

47. A communication control method for use with a wireless communication system including access points, the access points each including a wireless connection unit to wirelessly connect to other devices, where at least one access point is connected wirelessly to a backbone network, the method comprising:

a connection state measuring step of measuring a connection state of a station belonging to one of the access points;

a connection destination changeover determining step that determines whether a mode of a wireless interface is for a backhaul interface or for an access interface, according to information of the connection state measured by the connection state measuring unit; and a connection destination changeover step of conducting a changeover of a connection destination used by the wireless connection unit between an access point and a station according to information of the connection state measured by the connection state measuring step.

48. The communication control method in accordance with claim 47, wherein:

the access point includes one or more wireless connection units; and the connection destination changeover step conducts a changeover of the connection destination for at least one of the wireless connection units according to information of the connection state of each of the stations belonging to the access point.

49. The communication control method in accordance with claim 47, wherein:

the connection destination changeover step makes a check, before conducting the changeover of the connection destination by the wireless connection unit from the station to the access point, to determine whether there appears a station which is not connectible among the stations belonging to one of the access points in the wireless communication system, based on the information of the connection state measured by the connection state measuring step; and the connection destination changeover step conducts the changeover operation if it is determined that there does not appear any station which is not connectible among the stations.

50. The communication control method in accordance with claim 47, wherein:

the connection destination changeover step makes a check, before conducting the changeover of the connection destination by the wireless connection unit from the station to the access point, to determine whether the stations belonging to one of the access points in the wireless communication system are accommodated, based on the information of the connection state measured by the connection state measuring step; and the connection destination changeover step conducts the changeover operation if it is determined that the stations are accommodated.

51. The communication control method in accordance with claim 47, wherein:

the connection destination changeover step makes a check, before conducting the changeover of the connection destination by the wireless connection unit from the station to the access point, to determine whether a band between the access points is improved, based on the information of the connection state measured by the connection state measuring step; and the connection destination changeover step conducts a changeover operation if it is determined that the band is improved.

52. The communication control method in accordance with claim 47, wherein:

the connection destination changeover step makes a check, before conducting the changeover of the connection destination by the wireless connection unit from the station to the access point, to determine whether there appears a station that is not connectible to the backbone network among the access points in the wireless communication system, based on the information of the connection state measured by the connection state measuring step; and the connection destination changeover step conducts a changeover operation if it is determined that there does not appear any station that is not connectible to the backbone network.

53. The communication control method in accordance with claim 47, wherein:

the connection destination changeover step makes a check, before conducting the changeover of the connection destination by the wireless connection unit from the station to the access point, to determine whether a band between the access points is within a predetermined range for an amount of traffic of the stations belonging to one of the access stations in the wireless communication system, based on the information of the connection state measured by the connection state measuring step; and the connection destination changeover step conducts a changeover operation if it is determined that the band is within the range.

54. The communication control method in accordance with claim 47, wherein:

the connection destination changeover step makes a check, before conducting the changeover of the connection destination by the wireless connection unit from the station to the access point, to determine whether a total of bands used by the access points in the wireless communication system to connect stations is improved, based on the information of the connection state measured by the connection state measuring step; and the connection destination changeover step conducts a changeover operation if it is determined that the total is improved.

55. The communication control method in accordance with claim 47, wherein the connection changeover step is started if it is determined that a communication quality of the system is less than a predetermined threshold value, based on the information of the connection state measured by the connection state measuring step.

56. The communication control method in accordance with claim 47, wherein the connection changeover step is started if it is determined that a communication quality of the system is less than a predetermined threshold value, based on setting information of communication ranges connectible by wireless communication with other devices.

57. The communication control method in accordance with claim 47, further comprising the request responding step of responding to a connection request from a station, even if a connection destination has been set to the access point by the wireless connection unit, the connection destination changeover step being started if the request responding step receives a connection request from a station.

58. The communication control method in accordance with claim 47, wherein the connection state includes at least one of traffic information and topology information.

59. The communication control method in accordance with claim 47, wherein the station comprises a multi-frequency connection unit connectible not only when a connection destination of the wireless connection unit of the access point comprises a station but also when the connection destination comprises an access point, the communication control method comprising:

a connection destination search step for searching for one of the wireless connection units which is connectible to the multi-frequency connection unit;

a connection destination changeover determining step for determining whether a mode of a wireless interface is for a backhaul interface or for an access interface, according to information of the connection state measured by the connection state measuring unit; and a target changeover step for conducting, according to a result of the connection destination search step, a changeover operation for a connection target of the multi-frequency connection unit between a wireless connection unit for connection to a station and a wireless connection unit for connection between access points.

60. A non-transitory computer-readable storage medium storing a communication control program for use with a wireless communication system including access points, the access points each including a wireless connection unit to wirelessly connect to other devices where at least one access point is connected wirelessly to a backbone network, the program causing a computer to perform:

connection state measuring processing for measuring a connection state of a station belonging to one of the access points;

a connection destination changeover determining processing for determining whether a mode of a wireless interface is for a backhaul interface or for an access interface, according to information of the connection state measured by the connection state measuring unit; and connection destination changeover processing for conducting a changeover of a connection destination used by the wireless connection unit between an access point and a station according to information of the connection state measured by the connection state measuring processing.

61. The non-transitory computer-readable storage medium in accordance with claim 60, wherein:

the access point includes one or more wireless connection units; and the connection destination changeover processing conducts a changeover of the connection destination for at least one of the wireless connection units according to information of the connection state of each of the stations belonging to the access point.

62. The non-transitory computer-readable storage medium in accordance with claim 60, wherein:

the connection destination changeover processing makes a check, before conducting a changeover of the connection destination by the wireless connection unit from the station to the access point, to determine whether there appears a station that is not connectible among the stations belonging to one of the access points in the wireless communication system, based on the information of the connection state measured by the connection state measuring processing; and the connection destination changeover processing conducts a changeover operation if it is determined that there does not appear any station that is not connectible among the stations.

63. The non-transitory computer-readable storage medium in accordance with claim 60, wherein:

the connection destination changeover processing makes a check, before conducting a changeover of the connection destination by the wireless connection unit from the station to the access point, to determine whether the stations belonging to one of the access points in the wireless communication system are accommodated, based on the information of the connection state measured by the connection state measuring processing; and the connection destination changeover unit conducts a changeover operation if it is determined that the stations are accommodated.

64. The non-transitory computer-readable storage medium in accordance with claim 60, wherein:

the connection destination changeover processing makes a check, before conducting the changeover of the connection destination by the wireless connection unit from the station to the access point, to determine whether a band between the access points is improved on a basis of the information of the connection state measured by the connection state measuring processing; and the connection destination changeover processing conducts a changeover operation if it is determined that the band is improved.

65. The non-transitory computer-readable storage medium in accordance with claim 60, wherein:
the connection destination changeover processing makes a check, before conducting the changeover of the connection destination by the wireless connection unit from the station to the access point, to determine whether there appears a station which is not connectible to the backbone network among the access points in the wireless communication system, based on the information of the connection state measured by the connection state measuring processing; and
the connection destination changeover processing conducts a changeover operation if it is determined that there does not appear any station that is not connectible to the backbone network.

66. The non-transitory computer-readable storage medium in accordance with claim 60, wherein:
the connection destination changeover processing makes a check, before conducting the changeover of the connection destination by the wireless connection unit from the station to the access point, to determine whether a band between the access points is within a predetermined range for an amount of traffic of the stations belonging to one of the access stations in the wireless communication system, based on the information of the connection state measured by the connection state measuring processing; and
the connection destination changeover processing conducts a changeover operation if it is determined that the band is within the range.

67. The non-transitory computer-readable storage medium in accordance with claim 60, wherein:
the connection destination changeover processing makes a check, before conducting the changeover of the connection destination by the wireless connection unit from the station to the access point, to determine whether a total of bands used by the access points in the wireless communication system to connect stations is improved on a basis of the information of the connection state measured by the connection state measuring processing; and
the connection destination changeover processing conducts a changeover operation if it is determined that the total is improved.

68. The non-transitory computer-readable storage medium in accordance with claim 60, wherein a connection changeover processing is started if it is determined that a communication quality of the system is less than a predetermined threshold value, based on the information of the connection state measured by the connection state measuring processing.

69. The non-transitory computer-readable storage medium in accordance with claim 60, wherein a connection changeover processing is started if it is determined that a communication quality of the system is less than a predetermined threshold value, based on setting information of communication ranges connectible by wireless communication with other devices.

70. The non-transitory computer-readable storage medium in accordance with claim 60, further making a computer execute a request responding processing for responding to a connection request from a station, even if a connection destination has been set to the access point by the wireless connection unit,
the connection destination changeover processing being started if the request responding processing receives a connection request from a station.

71. The non-transitory computer-readable storage medium in accordance with claim 60, wherein the connection state includes at least one of traffic information and topology information.

72. The non-transitory computer-readable storage medium in accordance with claim 60, wherein the station comprises a multi-frequency connection unit connectible not only when a connection destination of the wireless connection unit of the access point comprises a station but also when the connection destination comprises an access point, the communication control program further making a computer execute:
connection destination search processing for searching for one of the wireless connection units which is connectible to the multi-frequency connection unit; and
target changeover processing for conducting, according to a result of the connection destination search processing, a changeover operation for a connection target of the multi-frequency connection unit between a wireless connection unit for connection to a station and a wireless connection unit for connection between access points.

* * * * *